(12) United States Patent
Inoue

(10) Patent No.: US 8,705,013 B2
(45) Date of Patent: Apr. 22, 2014

(54) DIFFRACTIVE OPTICAL ELEMENT, DISTANCE MEASURING APPARATUS AND DISTANCE MEASURING METHOD

(75) Inventor: Hideaki Inoue, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 263 days.

(21) Appl. No.: 13/208,586

(22) Filed: Aug. 12, 2011

(65) Prior Publication Data

US 2012/0050717 A1   Mar. 1, 2012

(30) Foreign Application Priority Data

Aug. 24, 2010  (JP) .................................. 2010-187636

(51) Int. Cl.
G01C 3/08  (2006.01)
(52) U.S. Cl.
USPC ....... 356/4.01; 356/3.01; 356/5.01; 356/5.09; 356/9; 356/625
(58) Field of Classification Search
USPC .................. 356/4.01, 3.01, 5.01, 5.09, 9, 625
See application file for complete search history.

(56) References Cited

U.S. PATENT DOCUMENTS

| | | | |
|---|---|---|---|
| 6,917,454 B2 | 7/2005 | Mori et al. | |
| 7,675,629 B2 * | 3/2010 | Ohsaki et al. | 356/515 |
| 2003/0222209 A1 * | 12/2003 | Mitchell | 250/231.1 |
| 2010/0201970 A1 * | 8/2010 | Pellen | 356/138 |

FOREIGN PATENT DOCUMENTS

| | | | |
|---|---|---|---|
| JP | 59-193407 A | | 11/1984 |
| JP | 6-349084 A | | 12/1994 |
| JP | 7-057295 A | | 3/1995 |
| JP | 2003-156626 A | | 5/2003 |
| JP | 2007-187581 A | | 7/2007 |
| JP | 2007087581 A | * | 7/2007 |
| JP | 4380557 B2 | | 10/2009 |

OTHER PUBLICATIONS

Dept. of Physics, Univ. of Illinois at Urbana-Champaign. "Green and Red Lasers Through a Diffraction Grating". 1996. http://demo.physics.uiuc.edu/lectdemo/scripts/demo_descript.idc?DemoID=1044.*
Japanese Office Action dated May 8, 2012 (and English translation thereof) in counterpart Japanese Application No. 2010-187636.

* cited by examiner

Primary Examiner — Isam Alsomiri
Assistant Examiner — Samantha K Abraham
(74) Attorney, Agent, or Firm — Holtz, Holtz, Goodman & Chick, PC

(57) ABSTRACT

The present invention provides a small diffractive optical element that emits twisted beam, a small distance measuring apparatus and a distance measuring method using a small diffractive optical element. A diffractive optical element includes a first diffractive grating that twists, in a coordinate space defined by an x-axis, a y-axis and a z-axis, parallel light forming a flat plane parallel to the x-axis and going advance in the z-axis direction so that an angle of the flat plane relative to the x-axis becomes a predetermined angle at a location where the parallel light traveling in the z-axis by a predetermined distance reaches.

25 Claims, 26 Drawing Sheets

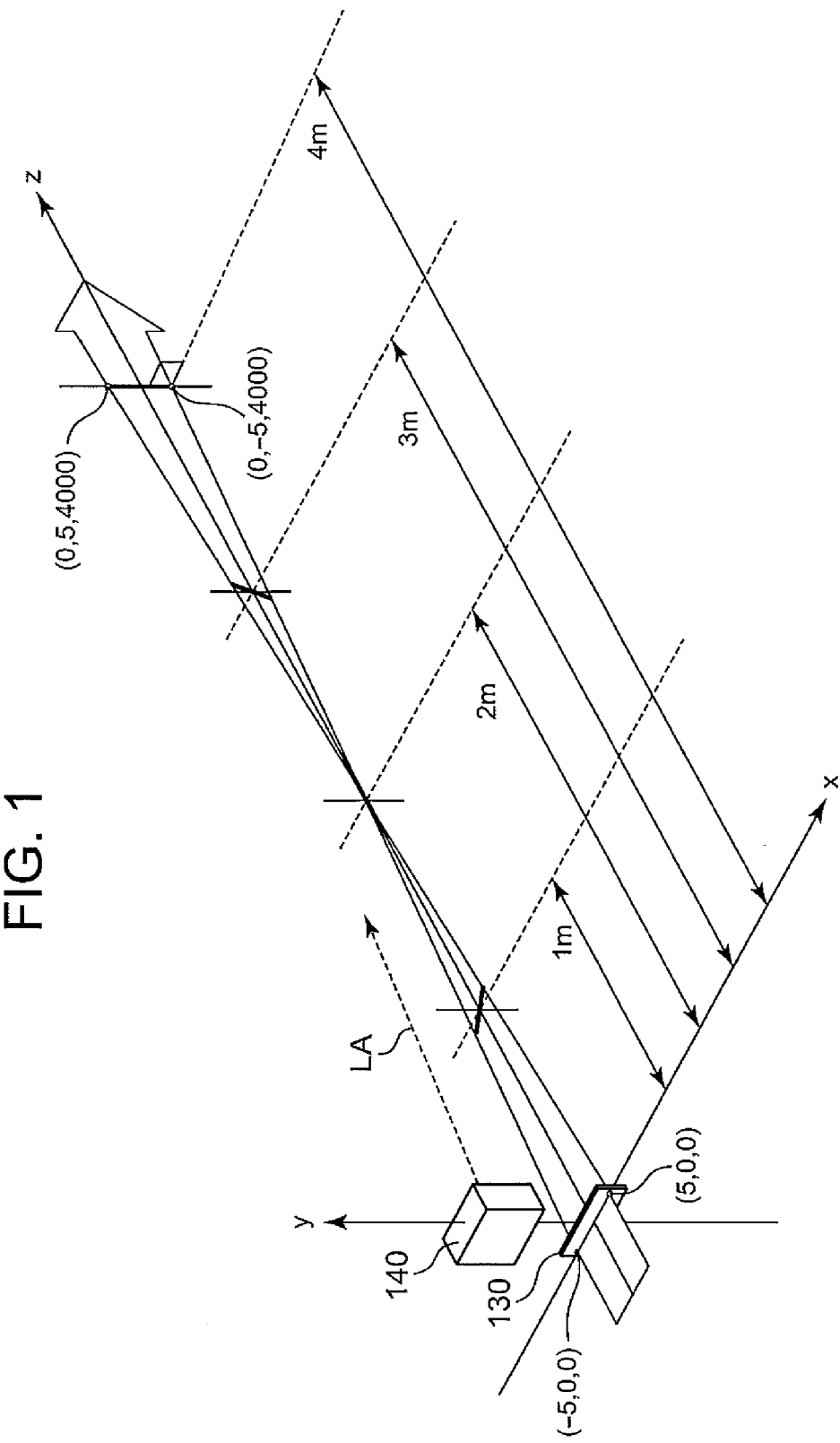

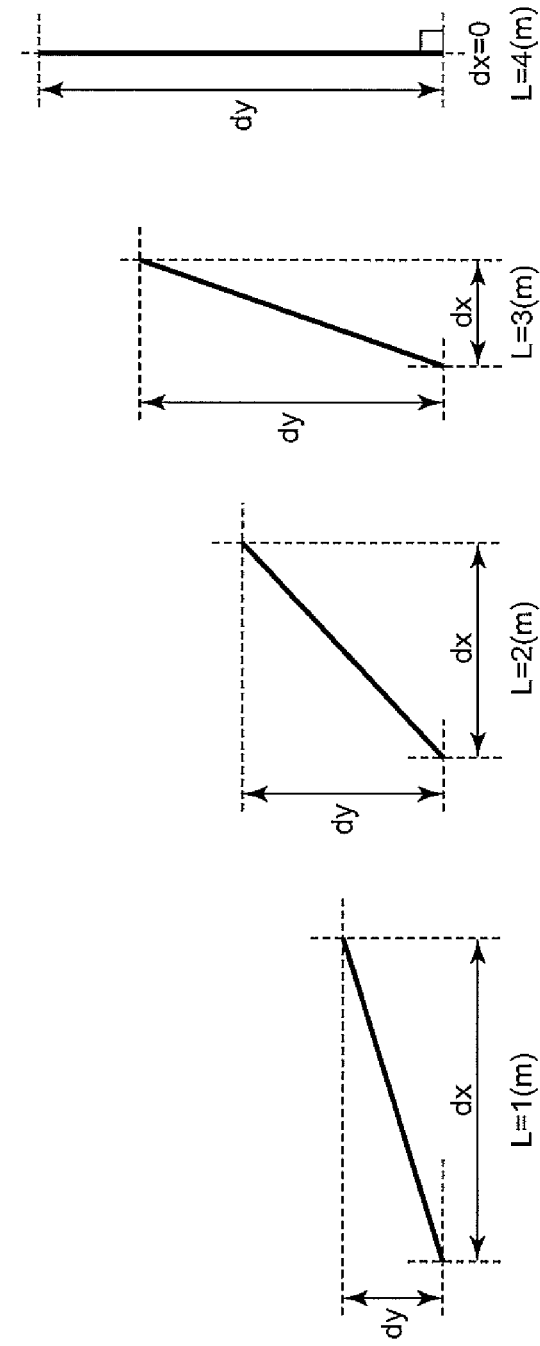
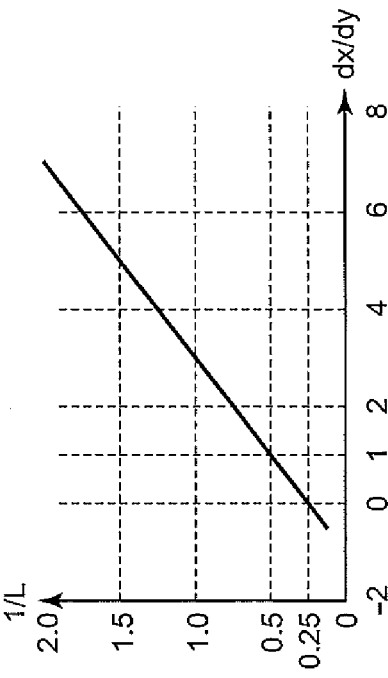
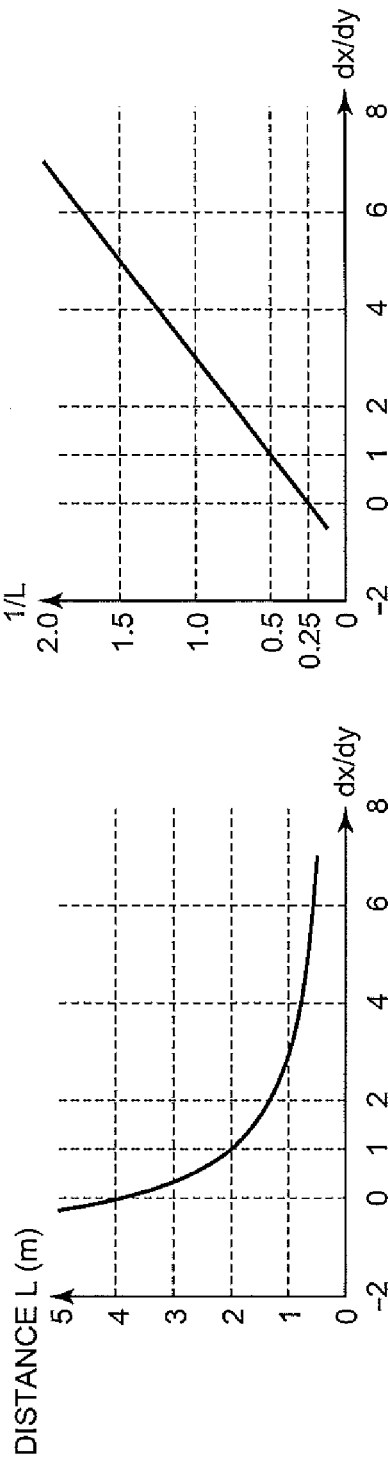

| REGION | START POINT COORDINATE | | | END POINT COORDINATE | | | DIRECTION RATIO | | | DIRECTION COSINE | | |
|---|---|---|---|---|---|---|---|---|---|---|---|---|
| | x | y | z | x' | y' | z' | x'-x | y'-y | z'-z | l | m | n |
| a | -5 | 0 | 0 | 0 | -5 | 4,000 | 5 | -5 | 4,000 | 0.0012500 | -0.0012500 | 0.9999984 |
| b | -4 | 0 | 0 | 0 | -4 | 4,000 | 4 | -4 | 4,000 | 0.0010000 | -0.0010000 | 0.9999990 |
| c | -3 | 0 | 0 | 0 | -3 | 4,000 | 3 | -3 | 4,000 | 0.0007500 | -0.0007500 | 0.9999994 |
| d | -2 | 0 | 0 | 0 | -2 | 4,000 | 2 | -2 | 4,000 | 0.0005000 | -0.0005000 | 0.9999998 |
| e | -1 | 0 | 0 | 0 | -1 | 4,000 | 1 | -1 | 4,000 | 0.0002500 | -0.0002500 | 0.9999999 |
| f | 0 | 0 | 0 | 0 | 0 | 4,000 | 0 | 0 | 4,000 | 0.0000000 | 0.0000000 | 1.0000000 |
| g | 1 | 0 | 0 | 0 | 1 | 4,000 | -1 | 1 | 4,000 | -0.0002500 | 0.0002500 | 0.9999999 |
| h | 2 | 0 | 0 | 0 | 2 | 4,000 | -2 | 2 | 4,000 | -0.0005000 | 0.0005000 | 0.9999998 |
| i | 3 | 0 | 0 | 0 | 3 | 4,000 | -3 | 3 | 4,000 | -0.0007500 | 0.0007500 | 0.9999994 |
| j | 4 | 0 | 0 | 0 | 4 | 4,000 | -4 | 4 | 4,000 | -0.0010000 | 0.0010000 | 0.9999990 |
| k | 5 | 0 | 0 | 0 | 5 | 4,000 | -5 | 5 | 4,000 | -0.0012500 | 0.0012500 | 0.9999984 |

| REGION | START POINT COORDINATE | | | END POINT COORDINATE | | | DIRECTION RATIO | | | DIRECTION COSINE | | |
|---|---|---|---|---|---|---|---|---|---|---|---|---|
| | x | y | z | x' | y' | z' | x'-x | y'-y | z'-z | l | m | n |
| p | 0 | -5 | 0 | 5 | 0 | 4,000 | 5 | 5 | 4,000 | 0.0012500 | 0.0012500 | 0.9999984 |
| q | 0 | -4 | 0 | 4 | 0 | 4,000 | 4 | 4 | 4,000 | 0.0010000 | 0.0010000 | 0.9999990 |
| r | 0 | -3 | 0 | 3 | 0 | 4,000 | 3 | 3 | 4,000 | 0.0007500 | 0.0007500 | 0.9999994 |
| s | 0 | -2 | 0 | 2 | 0 | 4,000 | 2 | 2 | 4,000 | 0.0005000 | 0.0005000 | 0.9999998 |
| t | 0 | -1 | 0 | 1 | 0 | 4,000 | 1 | 1 | 4,000 | 0.0002500 | 0.0002500 | 0.9999999 |
| u | 0 | 0 | 0 | 0 | 0 | 4,000 | 0 | 0 | 4,000 | 0.0000000 | 0.0000000 | 1.0000000 |
| v | 0 | 1 | 0 | -1 | 0 | 4,000 | -1 | -1 | 4,000 | -0.0002500 | -0.0002500 | 0.9999999 |
| w | 0 | 2 | 0 | -2 | 0 | 4,000 | -2 | -2 | 4,000 | -0.0005000 | -0.0005000 | 0.9999998 |
| x | 0 | 3 | 0 | -3 | 0 | 4,000 | -3 | -3 | 4,000 | -0.0007500 | -0.0007500 | 0.9999994 |
| y | 0 | 4 | 0 | -4 | 0 | 4,000 | -4 | -4 | 4,000 | -0.0010000 | -0.0010000 | 0.9999990 |
| z | 0 | 5 | 0 | -5 | 0 | 4,000 | -5 | -5 | 4,000 | -0.0012500 | -0.0012500 | 0.9999984 |

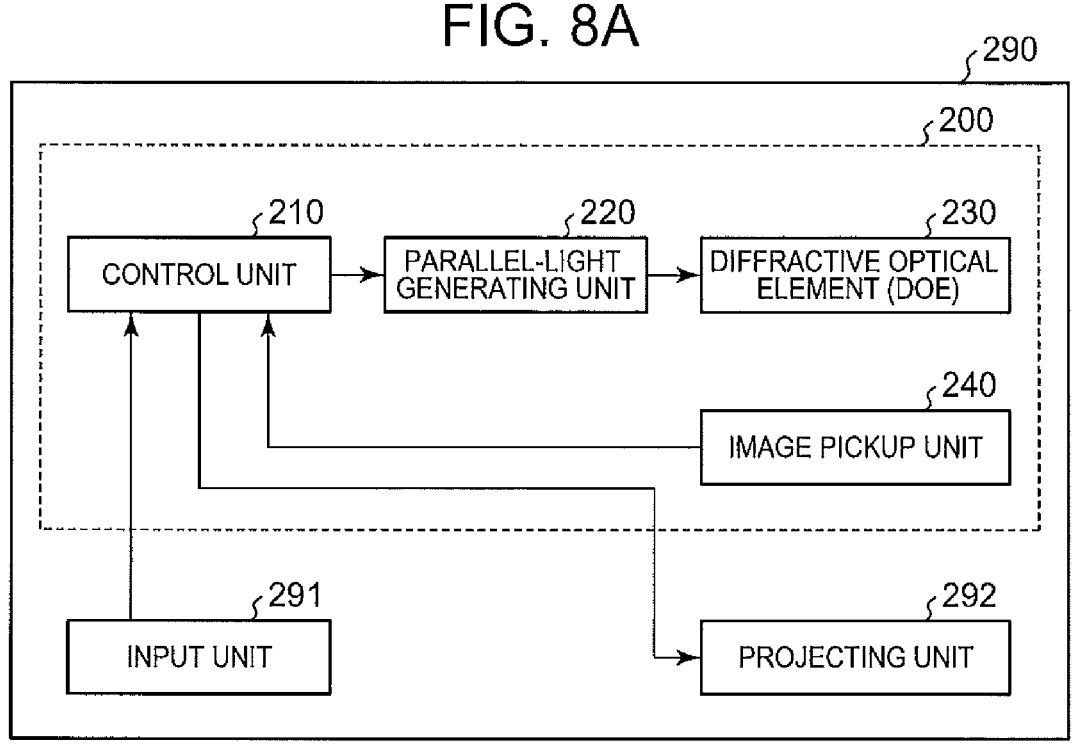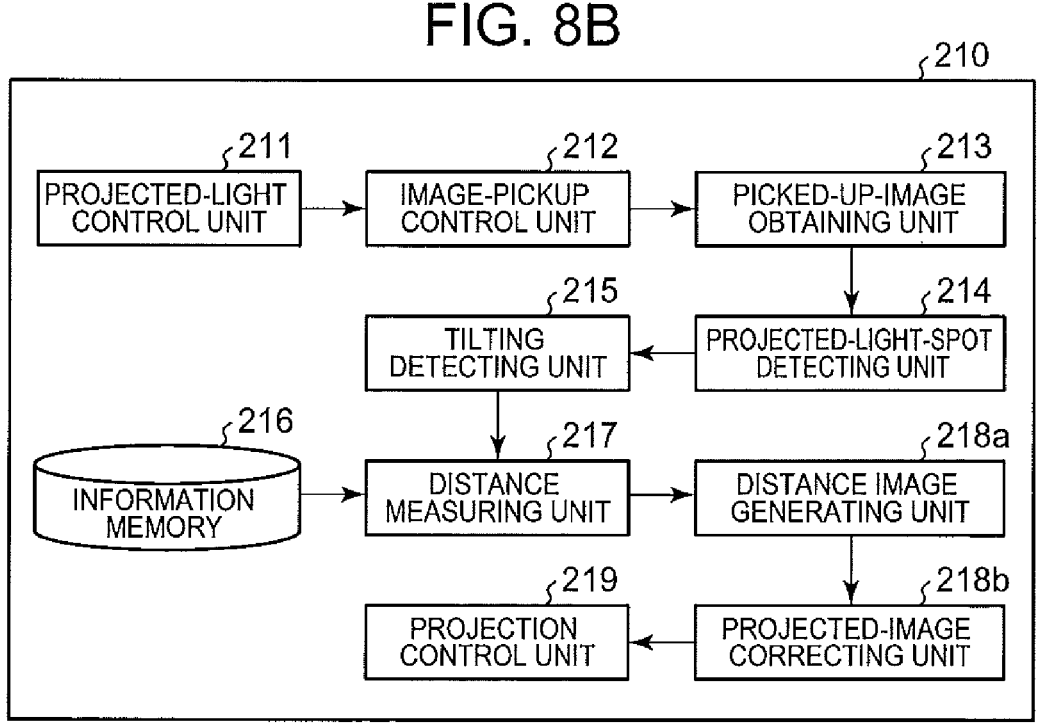

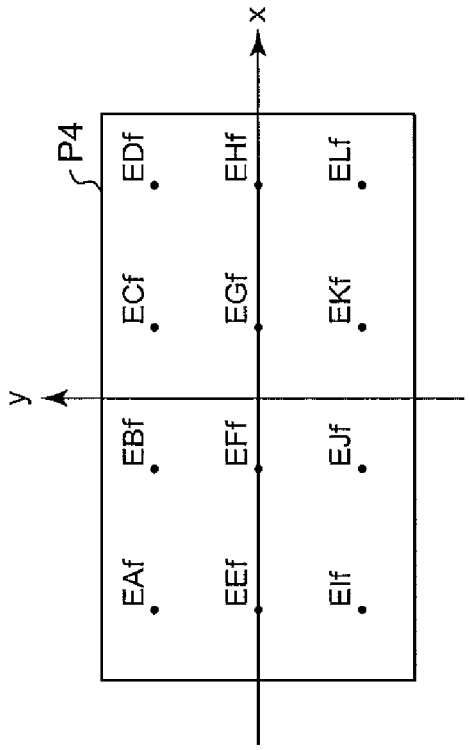
FIG. 10A
FIG. 10B
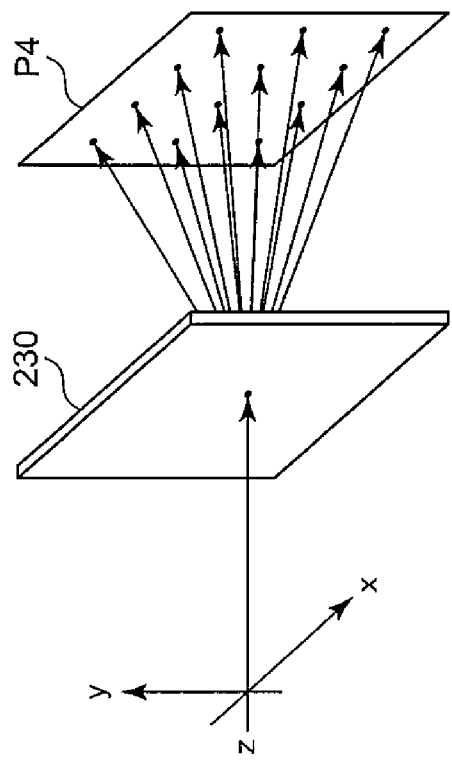
FIG. 10C
| REGION | START POINT COORDINATE | | | END POINT COORDINATE | | | DIRECTION RATIO | | | DIRECTION COSINE | | |
|---|---|---|---|---|---|---|---|---|---|---|---|---|
| | x | y | z | x' | y' | z' | x'-x | y'-y | z'-z | l | m | n |
| Af | 0 | 0 | 0 | -1,500 | 1,000 | 4,000 | -1,500 | 1,000 | 4,000 | -0.3418817 | 0.2279212 | 0.9116846 |
| Bf | 0 | 0 | 0 | -500 | 1,000 | 4,000 | -500 | 1,000 | 4,000 | -0.1203859 | 0.2407717 | 0.9630868 |
| Cf | 0 | 0 | 0 | 500 | 1,000 | 4,000 | 500 | 1,000 | 4,000 | 0.1203859 | 0.2407717 | 0.9630868 |
| Df | 0 | 0 | 0 | 1,500 | 1,000 | 4,000 | 1,500 | 1,000 | 4,000 | 0.3418817 | 0.2279212 | 0.9116846 |
| Ef | 0 | 0 | 0 | -1,500 | 0 | 4,000 | -1,500 | 0 | 4,000 | -0.3511234 | 0.0000000 | 0.9363292 |
| Ff | 0 | 0 | 0 | -500 | 0 | 4,000 | -500 | 0 | 4,000 | -0.1240347 | 0.0000000 | 0.9922779 |
| Gf | 0 | 0 | 0 | 500 | 0 | 4,000 | 500 | 0 | 4,000 | 0.1240347 | 0.0000000 | 0.9922779 |
| Hf | 0 | 0 | 0 | 1,500 | 0 | 4,000 | 1,500 | 0 | 4,000 | 0.3511234 | 0.0000000 | 0.9363292 |
| If | 0 | 0 | 0 | -1,500 | -1,000 | 4,000 | -1,500 | -1,000 | 4,000 | -0.3418817 | -0.2279212 | 0.9116846 |
| Jf | 0 | 0 | 0 | -500 | -1,000 | 4,000 | -500 | -1,000 | 4,000 | -0.1203859 | -0.2407717 | 0.9630868 |
| Kf | 0 | 0 | 0 | 500 | -1,000 | 4,000 | 500 | -1,000 | 4,000 | 0.1203859 | -0.2407717 | 0.9630868 |
| Lf | 0 | 0 | 0 | 1,500 | -1,000 | 4,000 | 1,500 | -1,000 | 4,000 | 0.3418817 | -0.2279212 | 0.9116846 |

FIG. 11A

TR REGION NAME TABLE

| ELEMENT REGION INDEX | DIFFRACTIVE REGION INDEX | | | | | | | | | | |
|---|---|---|---|---|---|---|---|---|---|---|---|
| | a | b | c | d | e | f | g | h | i | j | k |
| A | Aa | Ab | Ac | Ad | Ae | Af | Ag | Ah | Ai | Aj | Ak |
| B | Ba | Bb | Bc | Bd | Be | Bf | Bg | Bh | Bi | Bj | Bk |
| C | Ca | Cb | Cc | Cd | Ce | Cf | Cg | Ch | Ci | Cj | Ck |
| D | Da | Db | Dc | Dd | De | Df | Dg | Dh | Di | Dj | Dk |
| E | Ea | Eb | Ec | Ed | Ee | Ef | Eg | Eh | Ei | Ej | Ek |
| F | Fa | Fb | Fc | Fd | Fe | Ff | Fg | Fh | Fi | Fj | Fk |
| G | Ga | Gb | Gc | Gd | Ge | Gf | Gg | Gh | Gi | Gj | Gk |
| H | Ha | Hb | Hc | Hd | He | Hf | Hg | Hh | Hi | Hj | Hk |
| I | Ia | Ib | Ic | Id | Ie | If | Ig | Ih | Ii | Ij | Ik |
| J | Ja | Jb | Jc | Jd | Je | Jf | Jg | Jh | Ji | Jj | Jk |
| K | Ka | Kb | Kc | Kd | Ke | Kf | Kg | Kh | Ki | Kj | Kk |
| L | La | Lb | Lc | Ld | Le | Lf | Lg | Lh | Li | Lj | Lk |

FIG. 11B

TSx START POINT x COORDINATE TABLE

| ELEMENT REGION NUMBER | DIFFRACTIVE REGION NUMBER | | | | | | | | | | |
|---|---|---|---|---|---|---|---|---|---|---|---|
| | a | b | c | d | e | f | g | h | i | j | k |
| A | -5 | -4 | -3 | -2 | -1 | 0 | 1 | 2 | 3 | 4 | 5 |
| B | -5 | -4 | -3 | -2 | -1 | 0 | 1 | 2 | 3 | 4 | 5 |
| C | -5 | -4 | -3 | -2 | -1 | 0 | 1 | 2 | 3 | 4 | 5 |
| D | -5 | -4 | -3 | -2 | -1 | 0 | 1 | 2 | 3 | 4 | 5 |
| E | -5 | -4 | -3 | -2 | -1 | 0 | 1 | 2 | 3 | 4 | 5 |
| F | -5 | -4 | -3 | -2 | -1 | 0 | 1 | 2 | 3 | 4 | 5 |
| G | -5 | -4 | -3 | -2 | -1 | 0 | 1 | 2 | 3 | 4 | 5 |
| H | -5 | -4 | -3 | -2 | -1 | 0 | 1 | 2 | 3 | 4 | 5 |
| I | -5 | -4 | -3 | -2 | -1 | 0 | 1 | 2 | 3 | 4 | 5 |
| J | -5 | -4 | -3 | -2 | -1 | 0 | 1 | 2 | 3 | 4 | 5 |
| K | -5 | -4 | -3 | -2 | -1 | 0 | 1 | 2 | 3 | 4 | 5 |
| L | -5 | -4 | -3 | -2 | -1 | 0 | 1 | 2 | 3 | 4 | 5 |

FIG. 11C

TSy START POINT y COORDINATE TABLE

| ELEMENT REGION NUMBER | DIFFRACTIVE REGION NUMBER | | | | | | | | | | |
|---|---|---|---|---|---|---|---|---|---|---|---|
| | a | b | c | d | e | f | g | h | i | j | k |
| A | 0 | 0 | 0 | 0 | 0 | 0 | 0 | 0 | 0 | 0 | 0 |
| B | 0 | 0 | 0 | 0 | 0 | 0 | 0 | 0 | 0 | 0 | 0 |
| C | 0 | 0 | 0 | 0 | 0 | 0 | 0 | 0 | 0 | 0 | 0 |
| D | 0 | 0 | 0 | 0 | 0 | 0 | 0 | 0 | 0 | 0 | 0 |
| E | 0 | 0 | 0 | 0 | 0 | 0 | 0 | 0 | 0 | 0 | 0 |
| F | 0 | 0 | 0 | 0 | 0 | 0 | 0 | 0 | 0 | 0 | 0 |
| G | 0 | 0 | 0 | 0 | 0 | 0 | 0 | 0 | 0 | 0 | 0 |
| H | 0 | 0 | 0 | 0 | 0 | 0 | 0 | 0 | 0 | 0 | 0 |
| I | 0 | 0 | 0 | 0 | 0 | 0 | 0 | 0 | 0 | 0 | 0 |
| J | 0 | 0 | 0 | 0 | 0 | 0 | 0 | 0 | 0 | 0 | 0 |
| K | 0 | 0 | 0 | 0 | 0 | 0 | 0 | 0 | 0 | 0 | 0 |
| L | 0 | 0 | 0 | 0 | 0 | 0 | 0 | 0 | 0 | 0 | 0 |

FIG. 11D

TSz START POINT z COORDINATE TABLE

| ELEMENT REGION NUMBER | DIFFRACTIVE REGION NUMBER | | | | | | | | | | |
|---|---|---|---|---|---|---|---|---|---|---|---|
| | a | b | c | d | e | f | g | h | i | j | k |
| A | 0 | 0 | 0 | 0 | 0 | 0 | 0 | 0 | 0 | 0 | 0 |
| B | 0 | 0 | 0 | 0 | 0 | 0 | 0 | 0 | 0 | 0 | 0 |
| C | 0 | 0 | 0 | 0 | 0 | 0 | 0 | 0 | 0 | 0 | 0 |
| D | 0 | 0 | 0 | 0 | 0 | 0 | 0 | 0 | 0 | 0 | 0 |
| E | 0 | 0 | 0 | 0 | 0 | 0 | 0 | 0 | 0 | 0 | 0 |
| F | 0 | 0 | 0 | 0 | 0 | 0 | 0 | 0 | 0 | 0 | 0 |
| G | 0 | 0 | 0 | 0 | 0 | 0 | 0 | 0 | 0 | 0 | 0 |
| H | 0 | 0 | 0 | 0 | 0 | 0 | 0 | 0 | 0 | 0 | 0 |
| I | 0 | 0 | 0 | 0 | 0 | 0 | 0 | 0 | 0 | 0 | 0 |
| J | 0 | 0 | 0 | 0 | 0 | 0 | 0 | 0 | 0 | 0 | 0 |
| K | 0 | 0 | 0 | 0 | 0 | 0 | 0 | 0 | 0 | 0 | 0 |
| L | 0 | 0 | 0 | 0 | 0 | 0 | 0 | 0 | 0 | 0 | 0 |

FIG. 12A

TEx END POINT x COORDINATE TABLE

| | | \multicolumn{11}{c|}{DIFFRACTIVE REGION NUMBER} |
|---|---|---|---|---|---|---|---|---|---|---|---|---|
| | | a | b | c | d | e | f | g | h | i | j | k |
| ELEMENT REGION NUMBER | A | -1,500 | -1,500 | -1,500 | -1,500 | -1,500 | -1,500 | -1,500 | -1,500 | -1,500 | -1,500 | -1,500 |
| | B | -500 | -500 | -500 | -500 | -500 | -500 | -500 | -500 | -500 | -500 | -500 |
| | C | 500 | 500 | 500 | 500 | 500 | 500 | 500 | 500 | 500 | 500 | 500 |
| | D | 1,500 | 1,500 | 1,500 | 1,500 | 1,500 | 1,500 | 1,500 | 1,500 | 1,500 | 1,500 | 1,500 |
| | E | -1,500 | -1,500 | -1,500 | -1,500 | -1,500 | -1,500 | -1,500 | -1,500 | -1,500 | -1,500 | -1,500 |
| | F | -500 | -500 | -500 | -500 | -500 | -500 | -500 | -500 | -500 | -500 | -500 |
| | G | 500 | 500 | 500 | 500 | 500 | 500 | 500 | 500 | 500 | 500 | 500 |
| | H | 1,500 | 1,500 | 1,500 | 1,500 | 1,500 | 1,500 | 1,500 | 1,500 | 1,500 | 1,500 | 1,500 |
| | I | -1,500 | -1,500 | -1,500 | -1,500 | -1,500 | -1,500 | -1,500 | -1,500 | -1,500 | -1,500 | -1,500 |
| | J | -500 | -500 | -500 | -500 | -500 | -500 | -500 | -500 | -500 | -500 | -500 |
| | K | 500 | 500 | 500 | 500 | 500 | 500 | 500 | 500 | 500 | 500 | 500 |
| | L | 1,500 | 1,500 | 1,500 | 1,500 | 1,500 | 1,500 | 1,500 | 1,500 | 1,500 | 1,500 | 1,500 |

FIG. 12B

TEy END POINT y COORDINATE TABLE

| | | \multicolumn{11}{c|}{DIFFRACTIVE REGION NUMBER} |
|---|---|---|---|---|---|---|---|---|---|---|---|---|
| | | a | b | c | d | e | f | g | h | i | j | k |
| ELEMENT REGION NUMBER | A | 995 | 996 | 997 | 998 | 999 | 1,000 | 1,001 | 1,002 | 1,003 | 1,004 | 1,005 |
| | B | 995 | 996 | 997 | 998 | 999 | 1,000 | 1,001 | 1,002 | 1,003 | 1,004 | 1,005 |
| | C | 995 | 996 | 997 | 998 | 999 | 1,000 | 1,001 | 1,002 | 1,003 | 1,004 | 1,005 |
| | D | 995 | 996 | 997 | 998 | 999 | 1,000 | 1,001 | 1,002 | 1,003 | 1,004 | 1,005 |
| | E | -5 | -4 | -3 | -2 | -1 | 0 | 1 | 2 | 3 | 4 | 5 |
| | F | -5 | -4 | -3 | -2 | -1 | 0 | 1 | 2 | 3 | 4 | 5 |
| | G | -5 | -4 | -3 | -2 | -1 | 0 | 1 | 2 | 3 | 4 | 5 |
| | H | -5 | -4 | -3 | -2 | -1 | 0 | 1 | 2 | 3 | 4 | 5 |
| | I | -1,005 | -1,004 | -1,003 | -1,002 | -1,001 | -1,000 | -999 | -998 | -997 | -996 | -995 |
| | J | -1,005 | -1,004 | -1,003 | -1,002 | -1,001 | -1,000 | -999 | -998 | -997 | -996 | -995 |
| | K | -1,005 | -1,004 | -1,003 | -1,002 | -1,001 | -1,000 | -999 | -998 | -997 | -996 | -995 |
| | L | -1,005 | -1,004 | -1,003 | -1,002 | -1,001 | -1,000 | -999 | -998 | -997 | -996 | -995 |

FIG. 12C

TEz END POINT z COORDINATE TABLE

| | | \multicolumn{11}{c|}{DIFFRACTIVE REGION NUMBER} |
|---|---|---|---|---|---|---|---|---|---|---|---|---|
| | | a | b | c | d | e | f | g | h | i | j | k |
| ELEMENT REGION NUMBER | A | 4,000 | 4,000 | 4,000 | 4,000 | 4,000 | 4,000 | 4,000 | 4,000 | 4,000 | 4,000 | 4,000 |
| | B | 4,000 | 4,000 | 4,000 | 4,000 | 4,000 | 4,000 | 4,000 | 4,000 | 4,000 | 4,000 | 4,000 |
| | C | 4,000 | 4,000 | 4,000 | 4,000 | 4,000 | 4,000 | 4,000 | 4,000 | 4,000 | 4,000 | 4,000 |
| | D | 4,000 | 4,000 | 4,000 | 4,000 | 4,000 | 4,000 | 4,000 | 4,000 | 4,000 | 4,000 | 4,000 |
| | E | 4,000 | 4,000 | 4,000 | 4,000 | 4,000 | 4,000 | 4,000 | 4,000 | 4,000 | 4,000 | 4,000 |
| | F | 4,000 | 4,000 | 4,000 | 4,000 | 4,000 | 4,000 | 4,000 | 4,000 | 4,000 | 4,000 | 4,000 |
| | G | 4,000 | 4,000 | 4,000 | 4,000 | 4,000 | 4,000 | 4,000 | 4,000 | 4,000 | 4,000 | 4,000 |
| | H | 4,000 | 4,000 | 4,000 | 4,000 | 4,000 | 4,000 | 4,000 | 4,000 | 4,000 | 4,000 | 4,000 |
| | I | 4,000 | 4,000 | 4,000 | 4,000 | 4,000 | 4,000 | 4,000 | 4,000 | 4,000 | 4,000 | 4,000 |
| | J | 4,000 | 4,000 | 4,000 | 4,000 | 4,000 | 4,000 | 4,000 | 4,000 | 4,000 | 4,000 | 4,000 |
| | K | 4,000 | 4,000 | 4,000 | 4,000 | 4,000 | 4,000 | 4,000 | 4,000 | 4,000 | 4,000 | 4,000 |
| | L | 4,000 | 4,000 | 4,000 | 4,000 | 4,000 | 4,000 | 4,000 | 4,000 | 4,000 | 4,000 | 4,000 |

FIG. 13A

TRx-x' DIRECTION RATIO x-x' TABLE

| ELEMENT REGION NUMBER | DIFFRACTIVE REGION NUMBER | | | | | | | | | | |
|---|---|---|---|---|---|---|---|---|---|---|---|
| | | a | b | c | d | e | f | g | h | i | j | k |
| | A | -1,495 | -1,496 | -1,497 | -1,498 | -1,499 | -1,500 | -1,501 | -1,502 | -1,503 | -1,504 | -1,505 |
| | B | -495 | -496 | -497 | -498 | -499 | -500 | -501 | -502 | -503 | -504 | -505 |
| | C | 505 | 504 | 503 | 502 | 501 | 500 | 499 | 498 | 497 | 496 | 495 |
| | D | 1,505 | 1,504 | 1,503 | 1,502 | 1,501 | 1,500 | 1,499 | 1,498 | 1,497 | 1,496 | 1,495 |
| | E | -1,495 | -1,496 | -1,497 | -1,498 | -1,499 | -1,500 | -1,501 | -1,502 | -1,503 | -1,504 | -1,505 |
| | F | -495 | -496 | -497 | -498 | -499 | -500 | -501 | -502 | -503 | -504 | -505 |
| | G | 505 | 504 | 503 | 502 | 501 | 500 | 499 | 498 | 497 | 496 | 495 |
| | H | 1,505 | 1,504 | 1,503 | 1,502 | 1,501 | 1,500 | 1,499 | 1,498 | 1,497 | 1,496 | 1,495 |
| | I | -1,495 | -1,496 | -1,497 | -1,498 | -1,499 | -1,500 | -1,501 | -1,502 | -1,503 | -1,504 | -1,505 |
| | J | -495 | -496 | -497 | -498 | -499 | -500 | -501 | -502 | -503 | -504 | -505 |
| | K | 505 | 504 | 503 | 502 | 501 | 500 | 499 | 498 | 497 | 496 | 495 |
| | L | 1,505 | 1,504 | 1,503 | 1,502 | 1,501 | 1,500 | 1,499 | 1,498 | 1,497 | 1,496 | 1,495 |

FIG. 13B

TRy-y' DIRECTION RATIO y-y' TABLE

| ELEMENT REGION NUMBER | DIFFRACTIVE REGION NUMBER | | | | | | | | | | |
|---|---|---|---|---|---|---|---|---|---|---|---|
| | | a | b | c | d | e | f | g | h | i | j | k |
| | A | 995 | 996 | 997 | 998 | 999 | 1,000 | 1,001 | 1,002 | 1,003 | 1,004 | 1,005 |
| | B | 995 | 996 | 997 | 998 | 999 | 1,000 | 1,001 | 1,002 | 1,003 | 1,004 | 1,005 |
| | C | 995 | 996 | 997 | 998 | 999 | 1,000 | 1,001 | 1,002 | 1,003 | 1,004 | 1,005 |
| | D | 995 | 996 | 997 | 998 | 999 | 1,000 | 1,001 | 1,002 | 1,003 | 1,004 | 1,005 |
| | E | -5 | -4 | -3 | -2 | -1 | 0 | 1 | 2 | 3 | 4 | 5 |
| | F | -5 | -4 | -3 | -2 | -1 | 0 | 1 | 2 | 3 | 4 | 5 |
| | G | -5 | -4 | -3 | -2 | -1 | 0 | 1 | 2 | 3 | 4 | 5 |
| | H | -5 | -4 | -3 | -2 | -1 | 0 | 1 | 2 | 3 | 4 | 5 |
| | I | -1,005 | -1,004 | -1,003 | -1,002 | -1,001 | -1,000 | -999 | -998 | -997 | -996 | -995 |
| | J | -1,005 | -1,004 | -1,003 | -1,002 | -1,001 | -1,000 | -999 | -998 | -997 | -996 | -995 |
| | K | -1,005 | -1,004 | -1,003 | -1,002 | -1,001 | -1,000 | -999 | -998 | -997 | -996 | -995 |
| | L | -1,005 | -1,004 | -1,003 | -1,002 | -1,001 | -1,000 | -999 | -998 | -997 | -996 | -995 |

FIG. 13C

TRz-z' DIRECTION RATIO z-z' TABLE

| ELEMENT REGION NUMBER | DIFFRACTIVE REGION NUMBER | | | | | | | | | | |
|---|---|---|---|---|---|---|---|---|---|---|---|
| | | a | b | c | d | e | f | g | h | i | j | k |
| | A | 4,000 | 4,000 | 4,000 | 4,000 | 4,000 | 4,000 | 4,000 | 4,000 | 4,000 | 4,000 | 4,000 |
| | B | 4,000 | 4,000 | 4,000 | 4,000 | 4,000 | 4,000 | 4,000 | 4,000 | 4,000 | 4,000 | 4,000 |
| | C | 4,000 | 4,000 | 4,000 | 4,000 | 4,000 | 4,000 | 4,000 | 4,000 | 4,000 | 4,000 | 4,000 |
| | D | 4,000 | 4,000 | 4,000 | 4,000 | 4,000 | 4,000 | 4,000 | 4,000 | 4,000 | 4,000 | 4,000 |
| | E | 4,000 | 4,000 | 4,000 | 4,000 | 4,000 | 4,000 | 4,000 | 4,000 | 4,000 | 4,000 | 4,000 |
| | F | 4,000 | 4,000 | 4,000 | 4,000 | 4,000 | 4,000 | 4,000 | 4,000 | 4,000 | 4,000 | 4,000 |
| | G | 4,000 | 4,000 | 4,000 | 4,000 | 4,000 | 4,000 | 4,000 | 4,000 | 4,000 | 4,000 | 4,000 |
| | H | 4,000 | 4,000 | 4,000 | 4,000 | 4,000 | 4,000 | 4,000 | 4,000 | 4,000 | 4,000 | 4,000 |
| | I | 4,000 | 4,000 | 4,000 | 4,000 | 4,000 | 4,000 | 4,000 | 4,000 | 4,000 | 4,000 | 4,000 |
| | J | 4,000 | 4,000 | 4,000 | 4,000 | 4,000 | 4,000 | 4,000 | 4,000 | 4,000 | 4,000 | 4,000 |
| | K | 4,000 | 4,000 | 4,000 | 4,000 | 4,000 | 4,000 | 4,000 | 4,000 | 4,000 | 4,000 | 4,000 |
| | L | 4,000 | 4,000 | 4,000 | 4,000 | 4,000 | 4,000 | 4,000 | 4,000 | 4,000 | 4,000 | 4,000 |

FIG. 14A — Tl DIRECTION COSINE l TABLE

| ELEMENT REGION NUMBER | DIFFRACTIVE REGION NUMBER | | | | | | | | | | |
|---|---|---|---|---|---|---|---|---|---|---|---|
| | a | b | c | d | e | f | g | h | i | j | k |
| A | -0.340963 | -0.341147 | -0.341331 | -0.341515 | -0.341698 | -0.341882 | -0.342065 | -0.342249 | -0.342432 | -0.342615 | -0.342798 |
| B | -0.119234 | -0.119464 | -0.119695 | -0.119925 | -0.120156 | -0.120386 | -0.120616 | -0.120846 | -0.121077 | -0.121307 | -0.121537 |
| C | 0.121607 | 0.121363 | 0.121119 | 0.120874 | 0.120630 | 0.120386 | 0.120142 | 0.119897 | 0.119653 | 0.119409 | 0.119165 |
| D | 0.342976 | 0.342758 | 0.342539 | 0.342320 | 0.342101 | 0.341882 | 0.341663 | 0.341444 | 0.341224 | 0.341005 | 0.340786 |
| E | -0.350096 | -0.350302 | -0.350507 | -0.350713 | -0.350918 | -0.351123 | -0.351329 | -0.351534 | -0.351739 | -0.351944 | -0.352149 |
| F | -0.122813 | -0.123057 | -0.123302 | -0.123546 | -0.123790 | -0.124035 | -0.124279 | -0.124523 | -0.124767 | -0.125012 | -0.125256 |
| G | 0.125256 | 0.125012 | 0.124767 | 0.124523 | 0.124279 | 0.124035 | 0.123790 | 0.123546 | 0.123302 | 0.123057 | 0.122813 |
| H | 0.352149 | 0.351944 | 0.351739 | 0.351534 | 0.351329 | 0.351123 | 0.350918 | 0.350713 | 0.350507 | 0.350302 | 0.350096 |
| I | -0.340786 | -0.341005 | -0.341224 | -0.341444 | -0.341663 | -0.341882 | -0.342101 | -0.342320 | -0.342539 | -0.342758 | -0.342976 |
| J | -0.119165 | -0.119409 | -0.119653 | -0.119897 | -0.120142 | -0.120386 | -0.120630 | -0.120874 | -0.121119 | -0.121363 | -0.121607 |
| K | 0.121537 | 0.121307 | 0.121077 | 0.120846 | 0.120616 | 0.120386 | 0.120156 | 0.119925 | 0.119695 | 0.119464 | 0.119234 |
| L | 0.342798 | 0.342615 | 0.342432 | 0.342249 | 0.342065 | 0.341882 | 0.341698 | 0.341515 | 0.341331 | 0.341147 | 0.340963 |

FIG. 14B — Tm DIRECTION COSINE m TABLE

| ELEMENT REGION NUMBER | DIFFRACTIVE REGION NUMBER | | | | | | | | | | |
|---|---|---|---|---|---|---|---|---|---|---|---|
| | a | b | c | d | e | f | g | h | i | j | k |
| A | 0.226929 | 0.227127 | 0.227326 | 0.227524 | 0.227723 | 0.227921 | 0.228119 | 0.228318 | 0.228516 | 0.228714 | 0.228912 |
| B | 0.239672 | 0.239892 | 0.240112 | 0.240332 | 0.240552 | 0.240772 | 0.240992 | 0.241211 | 0.241431 | 0.241651 | 0.241870 |
| C | 0.239602 | 0.239836 | 0.240070 | 0.240304 | 0.240538 | 0.240772 | 0.241005 | 0.241239 | 0.241473 | 0.241707 | 0.241940 |
| D | 0.226752 | 0.226986 | 0.227220 | 0.227453 | 0.227687 | 0.227921 | 0.228155 | 0.228389 | 0.228623 | 0.228856 | 0.229090 |
| E | -0.001171 | -0.000937 | -0.000702 | -0.000468 | -0.000234 | 0.000000 | 0.000234 | 0.000468 | 0.000702 | 0.000936 | 0.001170 |
| F | -0.001241 | -0.000992 | -0.000744 | -0.000496 | -0.000248 | 0.000000 | 0.000248 | 0.000496 | 0.000744 | 0.000992 | 0.001240 |
| G | -0.001240 | -0.000992 | -0.000744 | -0.000496 | -0.000248 | 0.000000 | 0.000248 | 0.000496 | 0.000744 | 0.000992 | 0.001241 |
| H | -0.001170 | -0.000936 | -0.000702 | -0.000468 | -0.000234 | 0.000000 | 0.000234 | 0.000468 | 0.000702 | 0.000937 | 0.001171 |
| I | -0.229090 | -0.228856 | -0.228623 | -0.228389 | -0.228155 | -0.227921 | -0.227687 | -0.227453 | -0.227220 | -0.226986 | -0.226752 |
| J | -0.241940 | -0.241707 | -0.241473 | -0.241239 | -0.241005 | -0.240772 | -0.240538 | -0.240304 | -0.240070 | -0.239836 | -0.239602 |
| K | -0.241870 | -0.241651 | -0.241431 | -0.241211 | -0.240992 | -0.240772 | -0.240552 | -0.240332 | -0.240112 | -0.239892 | -0.239672 |
| L | -0.228912 | -0.228714 | -0.228516 | -0.228318 | -0.228119 | -0.227921 | -0.227723 | -0.227524 | -0.227326 | -0.227127 | -0.226929 |

FIG. 15

Tn DIRECTION COSINE n TABLE

| ELEMENT REGION NUMBER | DIFFRACTIVE REGION NUMBER | | | | | | | | | | |
|---|---|---|---|---|---|---|---|---|---|---|---|
| | a | b | c | d | e | f | g | h | i | j | k |
| A | 0.912276 | 0.912158 | 0.912040 | 0.911921 | 0.911803 | 0.911685 | 0.911566 | 0.911448 | 0.911329 | 0.911211 | 0.911092 |
| B | 0.963504 | 0.963421 | 0.963338 | 0.963254 | 0.963171 | 0.963087 | 0.963003 | 0.962919 | 0.962835 | 0.962751 | 0.962667 |
| C | 0.963225 | 0.963198 | 0.963170 | 0.963142 | 0.963115 | 0.963087 | 0.963059 | 0.963031 | 0.963003 | 0.962974 | 0.962946 |
| D | 0.911565 | 0.911589 | 0.911613 | 0.911637 | 0.911661 | 0.911685 | 0.911708 | 0.911732 | 0.911755 | 0.911779 | 0.911802 |
| E | 0.936713 | 0.936636 | 0.936560 | 0.936483 | 0.936406 | 0.936329 | 0.936252 | 0.936175 | 0.936098 | 0.936021 | 0.935943 |
| F | 0.992429 | 0.992399 | 0.992369 | 0.992339 | 0.992308 | 0.992278 | 0.992247 | 0.992217 | 0.992186 | 0.992155 | 0.992124 |
| G | 0.992124 | 0.992155 | 0.992186 | 0.992217 | 0.992247 | 0.992278 | 0.992308 | 0.992339 | 0.992369 | 0.992399 | 0.992429 |
| H | 0.935943 | 0.936021 | 0.936098 | 0.936175 | 0.936252 | 0.936329 | 0.936406 | 0.936483 | 0.936560 | 0.936636 | 0.936713 |
| I | 0.911802 | 0.911779 | 0.911755 | 0.911732 | 0.911708 | 0.911685 | 0.911661 | 0.911637 | 0.911613 | 0.911589 | 0.911565 |
| J | 0.962946 | 0.962974 | 0.963003 | 0.963031 | 0.963059 | 0.963087 | 0.963115 | 0.963142 | 0.963170 | 0.963198 | 0.963225 |
| K | 0.962667 | 0.962751 | 0.962835 | 0.962919 | 0.963003 | 0.963087 | 0.963171 | 0.963254 | 0.963338 | 0.963421 | 0.963504 |
| L | 0.911092 | 0.911211 | 0.911329 | 0.911448 | 0.911566 | 0.911685 | 0.911803 | 0.911921 | 0.912040 | 0.912158 | 0.912276 |

L=1(m)

L=2(m)

L=3(m)

L=4(m)

L=1(m)

L=2(m)

L=3(m)

L=4(m)

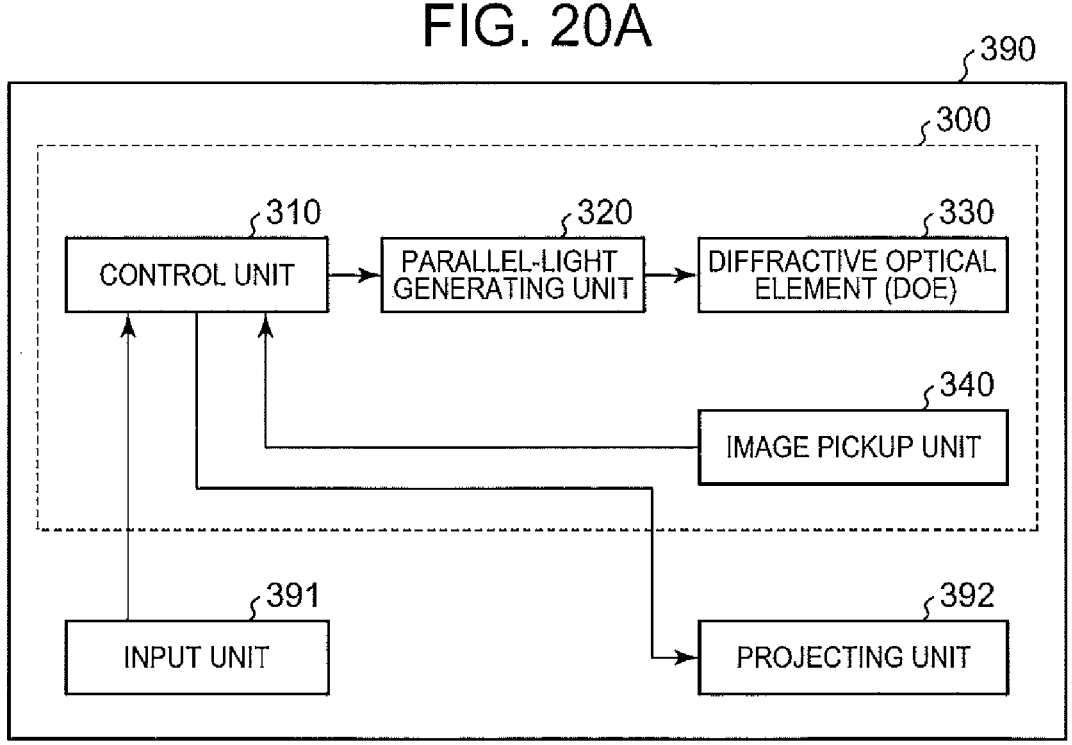
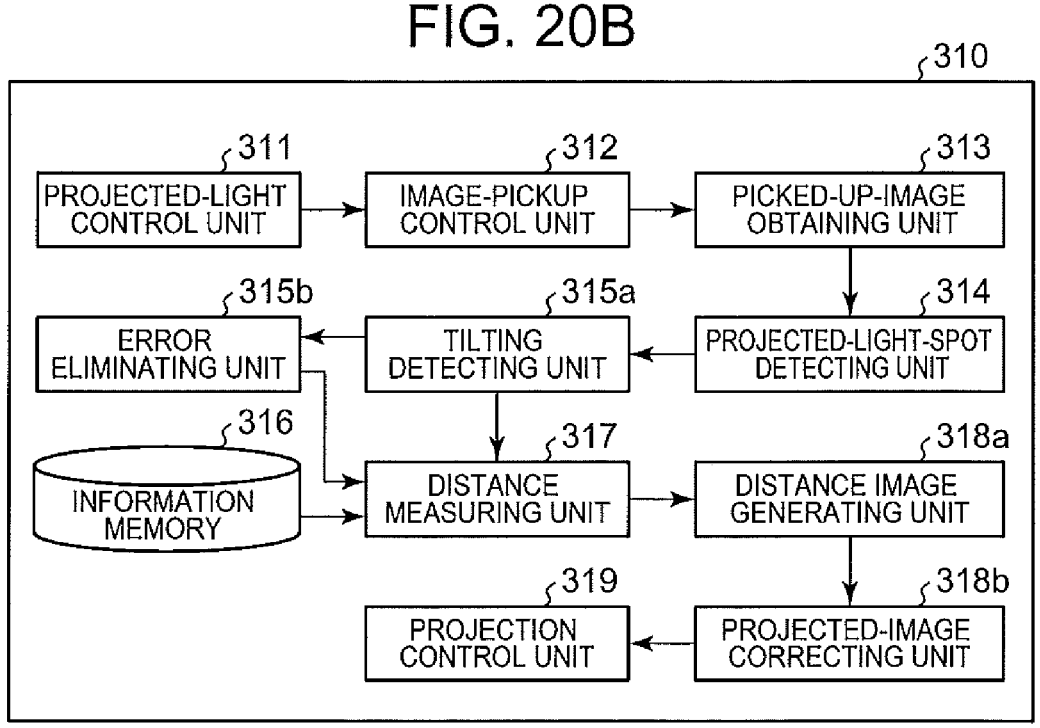

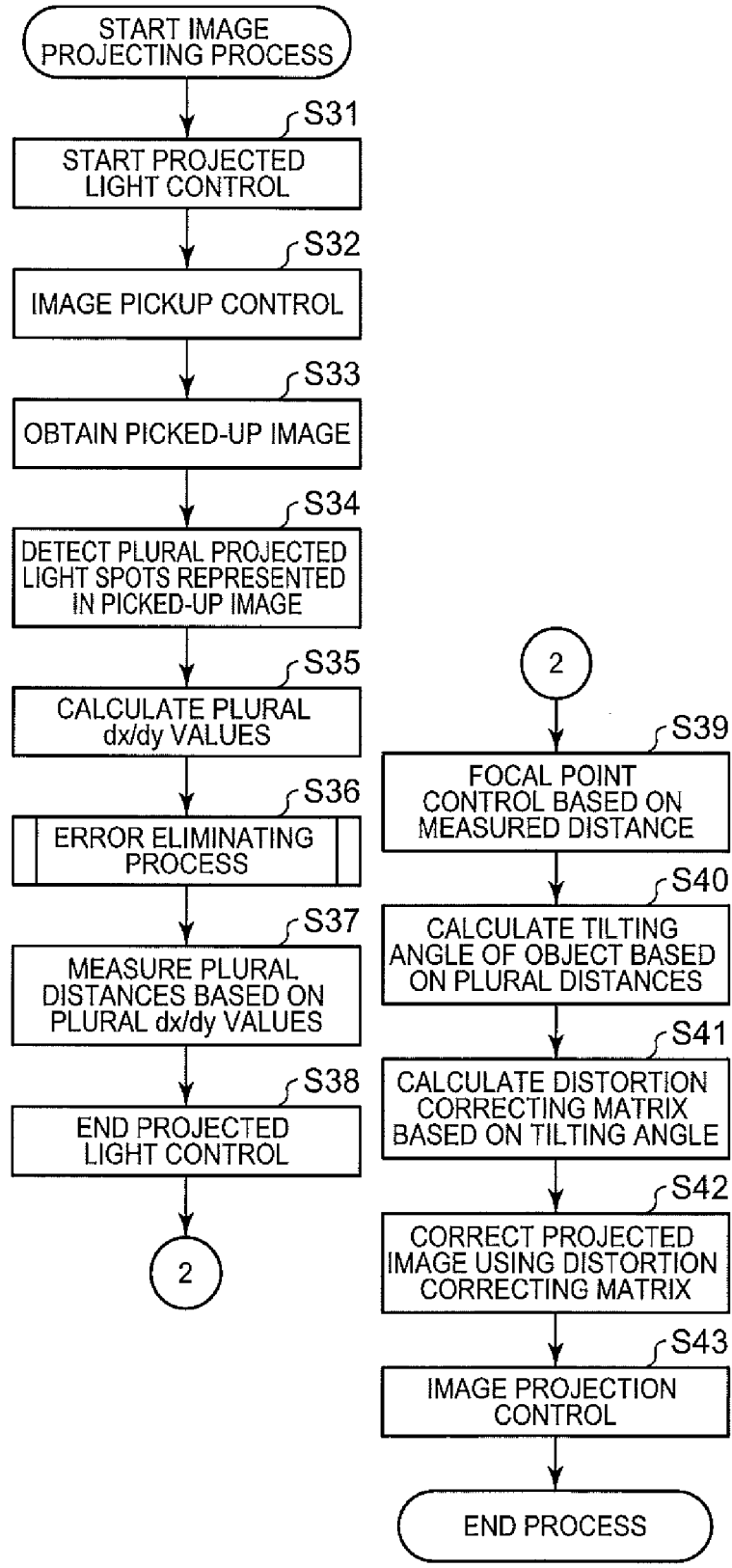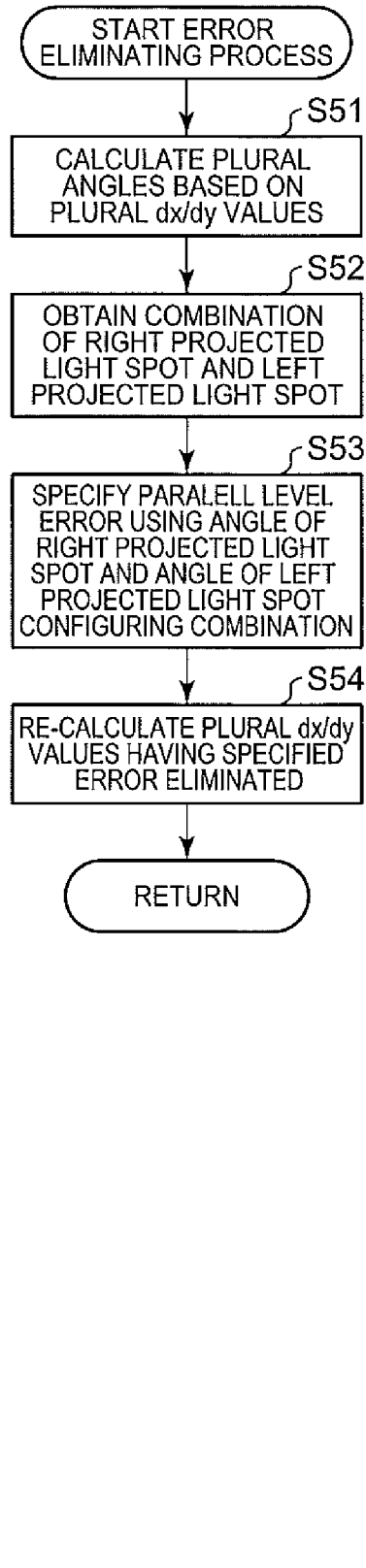

L=1(m)

L=2(m)

L=3(m)

L=4(m)

L=1(m)

L=2(m)

L=3(m)

L=4(m)

DIFFRACTIVE OPTICAL ELEMENT, DISTANCE MEASURING APPARATUS AND DISTANCE MEASURING METHOD

CROSS-REFERENCE TO RELATED APPLICATION

This application claims the benefit of Japanese Patent Application No. 2010-187636 filed Aug. 24, 2010, the entire disclosure of which is incorporated by reference herein.

FIELD

This application relates generally to a diffractive optical element, a distance measuring apparatus and a distance measuring method using the diffractive optical element.

BACKGROUND

Unexamined Japanese Patent Application KOKAI Publication No. 2007-187581 discloses a distance measuring apparatus that includes a cylindrical convex lens where flat beam enters, a camera which picks up a laser spot (hereinafter, referred to as a projected light spot) that is projected on an object by the beam passed through the cylindrical convex lens, and a distance obtaining unit which obtains a distance to the object based on the shape of the projected light spot picked up by the camera. The distance measuring apparatus allows flat beam to enter the cylindrical convex lens with a flat plane tilted by 45 degrees relative to the axial direction of the cylindrical convex lens, so that the beam (hereinafter, referred to as twisted beam) emitted from the cylindrical convex lens changes a rotation angle of the flat plane in accordance with the distance from the cylindrical convex lens. Accordingly, the shape of the projected light spot formed on the object becomes the shape of a line segment which changes a rotation angle in accordance with the distance from the cylindrical convex lens. Therefore, the distance measuring apparatus disclosed in Unexamined Japanese Patent Application KOKAI Publication No. 2007-187581 detects a rotation angle of the projected light spot picked up by the camera and measures a distance to the object based on the detected rotation angle.

It is difficult to reduce the size of the cylindrical lens, so that miniaturization of the distance measuring apparatus disclosed in Unexamined Japanese Patent Application KOKAI Publication No. 2007-187581 is difficult.

The present invention has been made in view of the above-explained circumstance, and it is an object of the present invention to provide a downsized diffractive optical element that emits twisted beam, a downsized distance measuring apparatus and a distance measuring method using the downsized diffractive optical element.

SUMMARY

In order to achieve the above object, a diffractive optical element according to a first aspect of the present invention includes:
a first diffractive grating that, in a coordinate space defined by an origin, an x-axis, a y-axis and a z-axis, twists x-incident light which is parallel light forming a flat plane parallel to the x-axis and advancing in a z-axis direction, such that an angle of the flat plane with respect to the x-axis becomes a predetermined angle at a position at which the x-incident light has traveled a predetermined distance in the z-axis direction.

Moreover, in order to achieve the above object, a distance measuring apparatus according to a second aspect of the present invention includes:
a parallel-light generating unit that, in a coordinate space defined by an origin, an x-axis, a y-axis and a z-axis, generates parallel light forming a flat plane parallel to the x-axis and advancing in a z-axis direction;
a diffractive optical element provided with a diffractive grating pattern that twists the parallel light such that an angle of the flat plane formed by the parallel light with respect to the x-axis becomes a predetermined angle at a position at which the parallel light has traveled a predetermined distance in the z-axis direction;
an image pickup unit that picks up a projected light spot which is formed on an object that is a target of distance measurement and formed by the parallel light twisted by the diffractive optical element; and
a distance measuring unit that measures a distance to the object based on a tilting of the projected light spot detected from a picked-up image picked up by the image pickup unit with respect to the x-axis.

Furthermore, in order to achieve the object, a distance measuring method according to a third aspect of the present invention includes:
a parallel-light generating step of generating, in a coordinate space defined by an origin, an x-axis, a y-axis and a z-axis, parallel light forming a flat plane parallel to the x-axis and advancing in a z-axis direction;
a diffraction step of causing a diffractive optical element provided with a diffractive grating pattern to twist the parallel light such that an angle of the flat plane formed by the parallel light with respect to the x-axis becomes a predetermined angle at a position at which the parallel light has traveled a predetermined distance in the z-axis direction;
an image pickup step of picking up a projected light spot which is formed on an object that is a target of distance measurement and formed by the parallel light twisted through the diffraction step; and
a distance measuring step of measuring a distance to the object based on a tilting of the projected light spot detected from on a picked-up image picked up by the image pickup step with respect to the x-axis.

BRIEF DESCRIPTION OF THE DRAWINGS

A more complete understanding of this application can be obtained when the following detailed description is considered in conjunction with the following drawings, in which:

FIG. 1 is a diagram showing illustrative twisted beam emitted from a diffractive optical element according to a first embodiment;

FIG. 2A is a diagram showing an illustrative projected light spot projected on a projection plane distant from the diffractive optical element by a distance "1 m" according to the first embodiment;

FIG. 2B is a diagram showing an illustrative projected light spot projected on a projection plane distant from the diffractive optical element by a distance "2 m" according to the first embodiment;

FIG. 2C is a diagram showing an illustrative projected light spot projected on a projection plane distant from the diffractive optical element by a distance "3 m" according to the first embodiment;

FIG. 2D is a diagram showing an illustrative projected light spot projected on a projection plane distant from the diffractive optical element by a distance "4 m" according to the first embodiment;

FIG. 2E is a diagram showing an illustrative relationship between a distance L from the diffractive optical element to a projection plane and dx/dy value of a projected light spot projected on the projection plane according to the first embodiment;

FIG. 2F is a diagram showing an illustrative relationship between an inverse number 1/L of a distance from the diffractive optical element to a projection plane and dx/dy value of a projected light spot projected on the projection plane according to the first embodiment;

FIG. 8A is a diagram showing an illustrative configuration of a projector having a distance measuring apparatus of the second embodiment;

FIG. 8B is a functional block diagram showing an illustrative function of a control unit according to the second embodiment;

FIG. 10A is a diagram for explaining multi-point divergence of incident beam by the diffractive optical element according to the second embodiment;

FIG. 10B is a diagram showing an illustrative end point of beam split by the diffractive optical element according to the second embodiment;

FIG. 10C is a diagram showing illustrative start point, end point, direction ratio and direction cosine of the diffractive optical element according to the second embodiment;

FIG. 11A is a diagram showing an illustrative index of the diffractive optical element for identifying a diffractive region according to the second embodiment;

FIG. 11B is a diagram showing an illustrative x coordinate value of the start point of a diffractive region according to the second embodiment;

FIG. 11C is a diagram showing an illustrative y coordinate value of the start point of the diffractive region according to the second embodiment;

FIG. 11D is a diagram showing an illustrative z coordinate value of the start point of the diffractive region according to the second embodiment;

FIG. 12A is a diagram showing an illustrative x coordinate value of the end point of a diffractive region according to the second embodiment;

FIG. 12B is a diagram showing an illustrative y coordinate value of the end point of the diffractive region according to the second embodiment;

FIG. 12C is a diagram showing an illustrative z coordinate value of the end point of the diffractive region according to the second embodiment;

FIG. 13A is a diagram showing an illustrative direction ratio x-x' of a diffractive region according to the second embodiment;

FIG. 13B is a diagram showing an illustrative direction ratio y-y' of the diffractive region according to the second embodiment;

FIG. 13C is a diagram showing an illustrative direction ratio z-z' of the diffractive region according to the second embodiment;

FIG. 14A is a diagram showing an illustrative direction cosine l of a diffractive region according to the second embodiment;

FIG. 14B is a diagram showing an illustrative direction cosine m of the diffractive region according to the second embodiment;

FIG. 15 is a diagram showing an illustrative direction cosine n of the diffractive region according to the second embodiment;

FIG. 20A is a diagram showing an illustrative configuration of a projector having a distance measuring apparatus according to the third embodiment;

FIG. 20B is a functional block diagram showing an illustrative function of a control unit according to the third embodiment;

FIG. 21A is a flowchart showing an illustrative image projecting process executed by the control unit of the distance measuring apparatus according to the third embodiment;

FIG. 21B is a flowchart showing an illustrative error eliminating process executed by the control unit of the distance measuring apparatus according to the third embodiment;

DETAILED DESCRIPTION

Figure 3A:
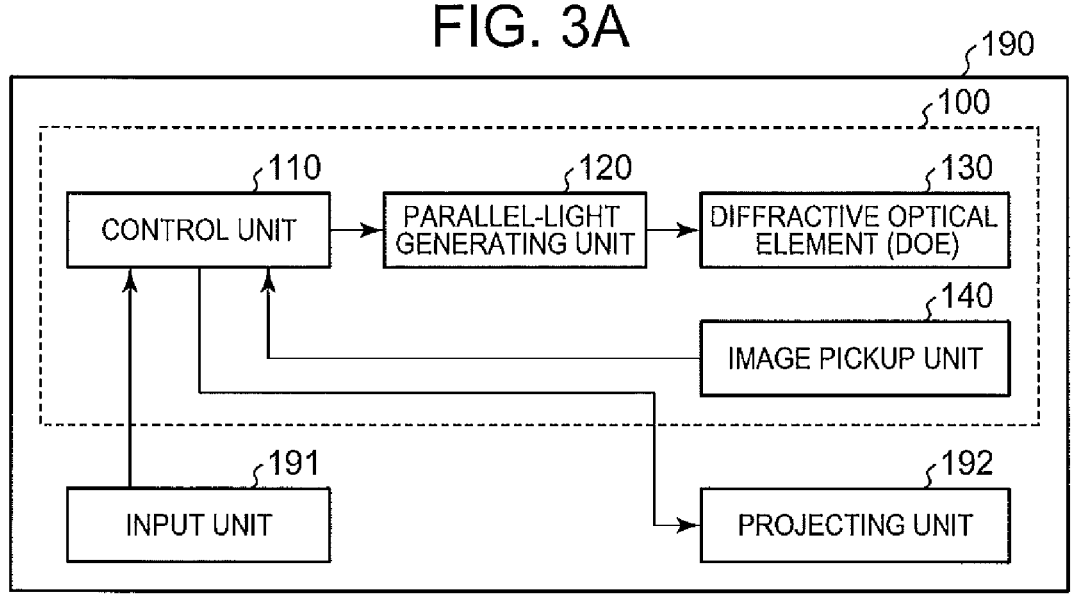
FIG. 3A is a diagram showing an illustrative configuration of a projector having a distance measuring apparatus of the first embodiment.

The best mode of the present invention will be explained below with reference to the accompanying drawings.

First Embodiment

A distance measuring apparatus 100 according to a first embodiment of the present invention emits, in a xyz space shown in FIG. 1, light forming a flat plane having an angle with an x-axis changed as going advance in a z-axis direction to an object. Next, the distance measuring apparatus 100 measures a distance to the object based on a tilting of a projected light spot in a shape like a line segment formed on the object by the emitted light shown in FIG. 2A. A projected light spot means a region where brightness is higher by a predetermined value (i.e., lighted up brighter) than a peripheral region by a predetermined distance from the projected light spot.

The distance measuring apparatus 100 is loaded in a projector 190 shown in FIG. 3A and includes a control unit 110, a parallel-light generating unit 120, a diffractive optical element (hereinafter, referred to as a DOE) 130, and an image pickup unit 140. The projector 190 includes, in addition to the distance measuring apparatus 100, an input unit 191 that inputs an operation signal in accordance with an operation given by a user of the projector 190, and a projecting unit 192 which is controlled by the control unit 110 and which projects an image on a screen. The parallel-light generating unit 120, the DOE 130, and the image pickup unit 140 will be explained prior to an explanation of the control unit 110.

The parallel-light generating unit 120 generates coherent parallel beam (x-incident light) which travels in the z-axis direction and which forms a flat plane parallel to the x-axis shown in FIG. 1. As a specific example, the parallel-light generating unit 120 includes a laser diode (hereinafter, referred to as an LD) which emits laser beam in the z-axis direction shown in FIG. 1, a cylindrical concave lens that expands the width of the laser beam in the x-axis direction, and a cylindrical convex lens that generates parallel beam from the laser beam having the width thereof expanded.

The DOE 130 generates, from the parallel beam which is generated by the parallel-light generating unit 120 and which forms the flat plane parallel to the x-axis, twisted beam which has an angle between the flat plane and the x-axis increased (i.e., twisted) as the parallel beam goes advance in the z-axis direction and which sets an angle between the flat plane and the x-axis to be "90 degrees" at an advanced location by "four meter (hereinafter, simply denoted as m" in the z-axis direction as shown in FIG. 1.

Figures 4A, 4B, 4C:
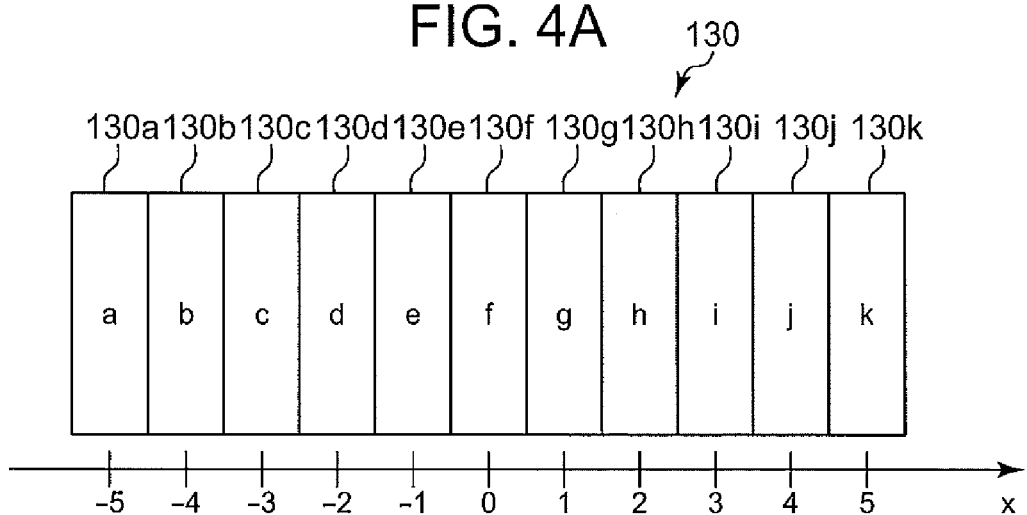
FIG. 4A is a diagram showing an illustrative diffractive region of the diffractive optical element according to the first embodiment.
FIG. 4B is a diagram showing illustrative start point, end point, direction ratio and direction cosine of a diffractive region of the diffractive optical element according to the first embodiment.
FIG. 4C is a diagram showing illustrative start point, end point, direction ratio and direction cosine of a diffractive region of a diffractive optical element according to a second modified example of the first embodiment.

More specifically, as shown in FIG. 4A, the DOE 130 includes eleven diffractive regions (x-diffractive regions) 130a to 130k in the x-axis direction each formed with a diffractive grating changing the traveling direction of incident beam. The number of diffractive regions of the DOE 130 is not limited to eleven. Moreover, the diffractive gratings may be formed of a plurality of binary (i.e., with substantially the same depth) grooves or may be formed of a plurality of grooves with different depth provided in the surface of the DOE 130.

The diffractive regions 130a to 130k are each formed with a diffractive grating that changes the traveling direction of incident parallel beam into a direction shown in FIG. 4B. The table shown in FIG. 4B has a point where the parallel beam is incident as a start point, a point advanced by "4 m" in the z-axis direction as an end point, and the traveling direction of the emitted light from the start point to the end point expressed as a direction cosine.

When the traveling direction of beam which is incident at a start point represented by coordinates (−5, 0, 0) and which travels in the z-axis direction is not changed by the DOE 130, such beam reaches a reach point represented by coordinates (−5, 0, z) (where z>0) no matter how much such beam goes advance in the z-axis direction. The traveling direction of the beam (i.e., the beam which is incident at the start point represented by coordinates (−5, 0, 0) and which goes advance in the z-axis direction) is changed into a direction toward an end point represented by coordinates (0, −5, 4000) by the diffractive region 130*a* of the DOE 130. Moreover, the traveling direction of beam incident at a start point represented by coordinates (−4, 0, 0) is changed into a direction toward an end point represented by coordinates (0, −4, 4000) by the diffractive region 130*b*. Likewise, the traveling direction of beams incident at respective coordinates from (−3, 0, 0) to (+5, 0, 0) is respectively changed into a respective directions toward respective end points represented by coordinates (0, −4, 4000) with a y coordinate value thereof being shifted by "+1", "+2", "+3", "+4", "+5", "+6", "+7", "+8", and "+9" by the DOE 130.

That is, the DOE 130 changes the traveling direction of emitted beam into a direction in which an angle with the positive direction of the x-axis becomes large as the x coordinate of the start point becomes large, so that a direction cosine l calculated based on a difference in the x coordinate between the start point and the end point (i.e., a direction ratio) x'−x, a difference in the y coordinate y'−y, and a difference in the z coordinate z'−z becomes a small value. Likewise, the DOE 130 changes the traveling direction of emitted beam into a direction in which the angle with the positive direction of the y-axis becomes small as the x coordinate of the start point becomes large, so that a direction cosine m becomes a large value.

Hence, as shown in FIGS. 2A to 2D, the more a distance between a projection plane which is vertical to the z-axis and on which twisted beam is projected and a start point increases from the location of the start point to the location of the end point, the more an angle between a projected light spot that is a line segment formed on the projection plane and the x-axis increases from "0 degree" to "90 degrees". The projected light spot in the shape of a line segment rotates in the counterclockwise direction. Moreover, a ratio (hereinafter, referred to as a dx/dy value) between a length dx of the projected light spot in the x-axis direction (a horizontal direction) and a length dy of the projected light spot in the y-axis direction (a vertical direction) is inversely proportional to a distance L from the start point to the projected light spot as shown in FIG. 2E, and is proportional to an inverse number of the distance L from the start point to the projected light spot as shown in FIG. 2F.

The DOE 130 may generate, from the parallel beam generated by the parallel-light generating unit 120 and forming the flat plane parallel to the x-axis, twisted beam with a clockwise rotation so that an angle between the flat plane and the x-axis decreases (i.e., twisted clockwise) as the parallel beam goes advance in the z-axis direction and an angle between the flat plane and the x-axis becomes "−90 degrees" at a location advanced by "4 m" in the z-axis direction.

That is, the DOE 130 may change the traveling direction of beam which is incident at a start point represented by coordinates (−5, 0, 0) and which goes advance in the z-axis direction into a direction toward an end point represented by coordinates (0, +5, 4000) by the diffractive region 130*a* of the DOE 130. Moreover, the DOE 130 may change respective traveling directions of beams incident at respective start points represented by coordinates from (−4, 0, 0) to (+5, 0, 0) into respective directions toward respective end points represented by respective coordinates (0, +5, 4000) with the y coordinate value thereof being shifted by "−1", "−2", "−3", "−4", "−5", "−6", "−7", "−8", "−9", and "−10".

The image pickup unit 140 shown in FIG. 3A is configured by, for example, a digital camera, and as shown in FIG. 1, is arranged so that an optical axis LA is substantially parallel to the z-axis, the main scanning direction is parallel to the x-axis, and the sub scanning direction is parallel to the y-axis. When the DOE 130 emits twisted beam to the object, the image pickup unit 140 is controlled by the control unit 110 in order to pick up a projected light spot formed on the object by the twisted beam.

Figure 3B:
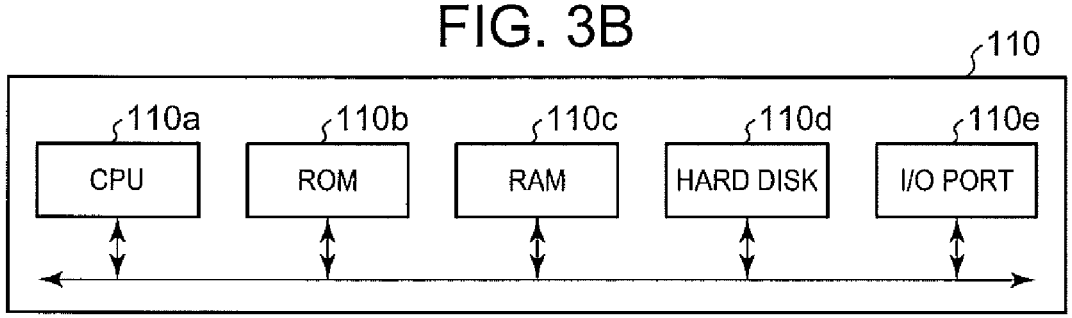
FIG. 3B is a hardware configuration diagram showing an illustrative configuration of a control unit according to the first embodiment.

The control unit 110 shown in FIG. 3A includes, for example, as shown in FIG. 3B, a CPU (Central Processing Unit) 110*a*, a ROM (Read Only Memory) 110*b*, a RAM (Random Access Memory) 110*c*, a hard disk 100*d*, and an input/output port (hereinafter, referred to as an I/O port) 100*e*.

The CPU 110*a* executes software processing in accordance with a program stored in the ROM 110*b* or the hard disk 100*d*, thereby comprehensively controlling the projector 190 including the distance measuring apparatus 100. The RAM 110*c* temporarily stores information (data) to be processed while the CPU 110*a* is running the program.

The hard disk 100*d* stores image data representing an image, a program, and various data tables looked up when the program is run. The data tables stored by the hard disk 100*d* include a distance table shown in FIG. 2F which is storing plural pieces of information associated with information representing a dx/dy value of a projected spot and information representing an inverse number 1/L of a distance from the start point to the projected light spot. The I/O port 100*e* exchanges data with each unit connected to the control unit 110.

Figure 3C:
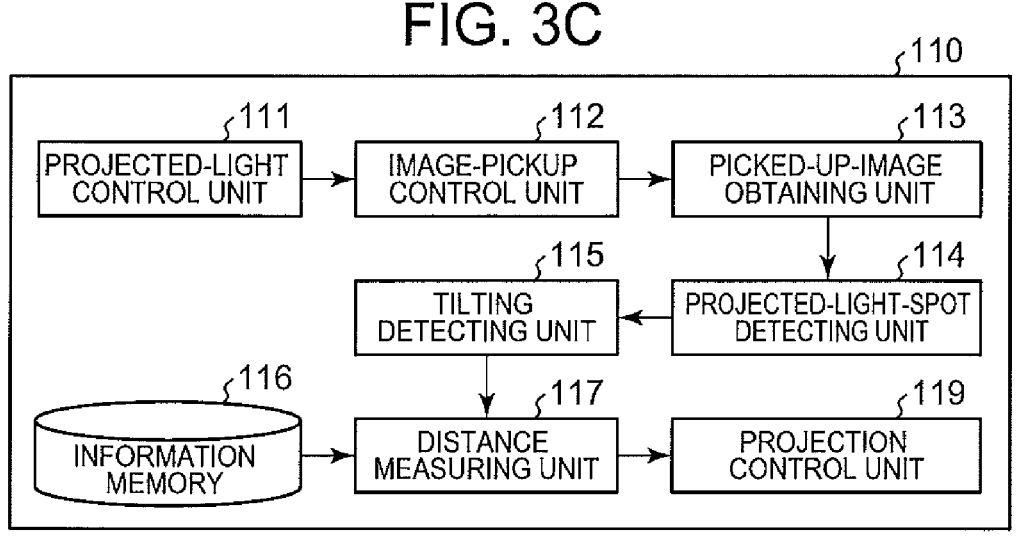
FIG. 3C is a functional block diagram showing an illustrative function of the control unit of the first embodiment.
Figure 5:
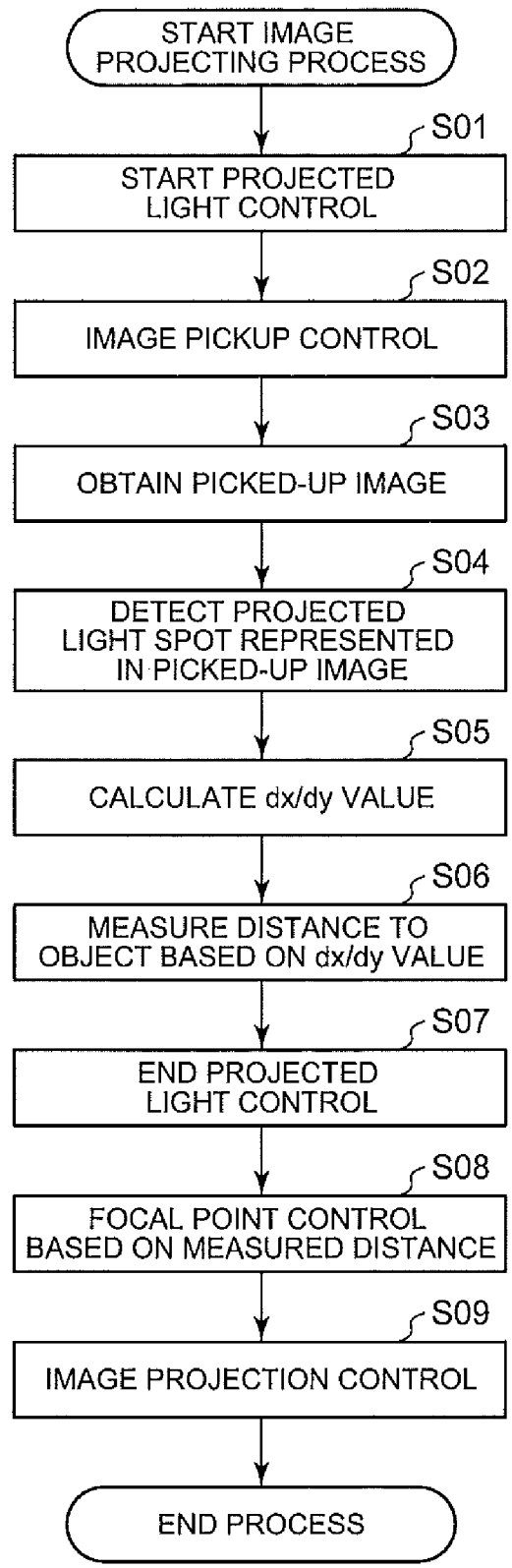
FIG. 5 is a flowchart showing an illustrative image projecting process executed by the control unit of the distance measuring apparatus according to the first embodiment.

The control unit 110 executes an image projecting process shown in FIG. 5 using the hardware shown in FIG. 3B, thereby functioning as, as shown in FIG. 3C, a projected-light control unit 111, an image-pickup control unit 112, a picked-up-image obtaining unit 113, a projected-light-spot detecting unit 114, a tilting detecting unit 115, an information memory unit 116, a distance measuring unit 117, and a projection control unit 119.

Upon starting of the image projecting process shown in FIG. 5, the projected-light control unit 111 shown in FIG. 3C causes the parallel-light generating unit 120 shown in FIG. 3A to generate parallel light into the DOE 130, thereby starting projected light control of emitting twisted beam to the object from the DOE 130 (step S01). Next, the image-pickup control unit 112 shown in FIG. 3B controls the image pickup unit 140 shown in FIG. 3A so as to pick up the image of the object irradiated with the twisted beam (step S02). Thereafter, the picked-up-image obtaining unit 113 obtains a picked-up image of the object irradiated with the twisted beam from the image pickup unit 140 (step S03).

Thereafter, the projected-light-spot detecting unit 114 detects a projected light spot represented in the picked-up image based on the brightness of pixel values configuring the picked-up image (step S04). Next, the tilting detecting unit 115 detects the length of the detected projected light spot in the main scanning direction and the length thereof in the sub scanning direction, and calculates a dx/dy value with the detected length of the projected light spot in the main scanning direction being as dx and the detected length thereof in the sub scanning direction being as dy (step S05).

Next, the distance measuring unit 117 searches information representing an inverse number of a distance associated with information representing the dx/dy value calculated in the step S05 from the distance table stored in the information memory unit 116, and calculates an inverse number of the value represented by the searched information, thereby measuring a distance to the object (step S06). Thereafter, the projected-light control unit 111 controls the parallel-light generating unit 120 so as to quit generating parallel light, thereby terminating the projected light control (step S07).

Next, the projection control unit 119 performs focal point control for controlling the projecting unit 192 shown in FIG. 3A so that a focal point is positioned on a screen that is the object based on the distance measured in the step S06 (step S08). Thereafter, the projection control unit 119 performs image projection control for controlling the projecting unit 192 so as to project an image specified by an operation signal input from the input unit 191 (step S09), and terminates execution of the image projecting process.

According to the above-explained configuration, the diffractive grating formed in the DOE 130 changes the traveling direction of parallel light that goes advance in the z-axis direction while forming a flat plane parallel to the x-axis into a direction in which a rotation angle of the flat plane relative to the x-axis becomes a predetermined angle at a location advanced in the z-axis direction by a predetermined distance. Accordingly, even though the DOE 130 is small in size and inexpensive in comparison with, for example, a cylindrical lens, when parallel light (parallel beam) forming a flat plane parallel to the x-axis enters the DOE 130, the DOE 130 can emit flat light (i.e., twisted beam), a rotation angle of the flat plane of which relative to the x-axis changes in accordance with the distance from the DOE 130. Accordingly, the DOE 130 can change a rotation angle of, with the x-axis, the projected light spot in the shape of a line segment formed by emitted light to the object subjected to a distance measurement in accordance with the distance from the DOE 130. Therefore, according to the above-explained configuration, even though the distance measuring apparatus 100 is small in size and inexpensive, a distance to the object can be measured with the same precision as that of the related art.

Moreover, according to the above-explained configuration, in the DOE 130, the diffractive region among the diffractive regions 130a to 130k of the DOE 130 formed at a location more distant from the origin in the x-axis direction can change the traveling direction of the incident light (the incident beam) going advance in the z-axis direction into a direction in which the y coordinate of the end point becomes larger or smaller. Accordingly, when parallel light forming a flat plane parallel to the x-axis and having a predetermined width enters the DOE 130, the DOE 130 can emit flat light, a difference in the y coordinate value at both ends of the flat plane of which changes in accordance with the distance from the DOE 130. Since, by the DOE 130, the difference in the y coordinate value at both ends of the projected light spot in the shape of a line segment formed by emitted light to the object subjected to a distance measurement can be changed in accordance with the distance from the DOE 130, even though the distance measuring apparatus 100 is small in size and inexpensive, the distance measuring apparatus 100 can measure a distance to the object based on the difference in the y coordinate value at both ends of the projected light spot. In particular, when parallel light forming a flat plane parallel to the x-axis and having a predetermined width enters the DOE 130, the DOE 130 can emit flat light, the difference in the y coordinate value at both ends of the flat plane of which increases as the distance from the DOE 130 becomes long. Therefore, even if the distance from the DOE becomes long, and, for example, the projected light spot represented in the picked-up image becomes small, the distance measuring apparatus 100 can measure the distance to the object precisely since the difference in the y coordinate value at both ends of the projected light spot increases.

Furthermore, according to the above-explained configuration, in the DOE 130, the diffractive region among the diffractive regions 130a to 130k of the DOE 130 formed at a location more distant from the origin in the x-axis direction can change the traveling direction of incident light (incident beam) going advance in the z-axis direction into a direction in which the y coordinate of the end point becomes large and the x coordinate thereof becomes smaller than that of the start point, or a direction in which the y coordinate becomes small and the x coordinate of the end point becomes smaller than that of the start point. Hence, when parallel light forming a flat plane parallel to the x-axis and having a predetermined width enters the DOE 130, the DOE 130 can emit flat light, differences in both x coordinate value and y coordinate value at both ends of the flat plane of which changes in accordance with the distance from the DOE 130. Accordingly, even though the distance measuring apparatus 100 is small in size and inexpensive, the distance measuring apparatus 100 can measure a distance to the object based on both of the difference in the y coordinate value and the difference in the x coordinate value at both ends of the projected light spot. In particular, when parallel light forming a flat plane parallel to the x-axis and having a predetermined width enters the DOE 130, the DOE 130 can emit flat light, the difference in the x coordinate value at both ends of the flat plane of which decreases and the difference in the y coordinate value at both ends of the flat plane of which increases as the distance from the DOE 130 becomes long. Therefore, even if the distance from the DOE 130 becomes long, and, for example, the projected light spot represented in the picked-up image becomes small, the distance measuring apparatus 100 can measure the distance to the object precisely since the ratio of the difference in the y coordinate value relative to the difference in the x coordinate value at both ends of the projected light spot increases (i.e., the ratio of the difference in the x coordinate value relative to the difference in the y coordinate value decreases).

First Modified Example of First Embodiment

Figure 6:
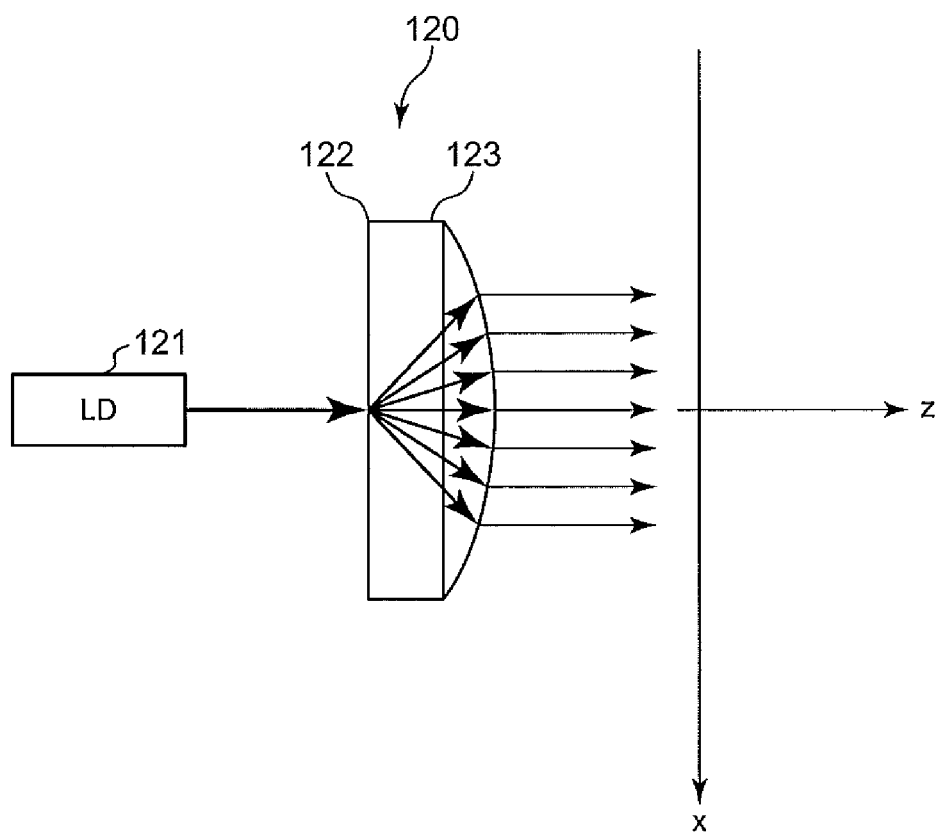
FIG. 6 is a diagram showing an illustrative parallel-light generating unit according to a fist modified example of the first embodiment.

In the first embodiment, the explanation was given of a case in which the parallel-light generating unit 120 includes the LD, the cylindrical concave lens, and the cylindrical convex lens. The present invention is, however, not limited to this configuration, and for example, as shown in FIG. 6, the parallel-light generating unit 120 may include an LD 121 that emits laser beam in the z-axis direction, a line generator DOE 122 that expands the width of the laser beam in the x-axis direction, and a flat convex lens 123 that generates parallel beam from the laser beam having the width expanded. According to this configuration, the parallel-light generating unit 120 is configured by the line generator DOE and the flat convex lens, not by two cylindrical lenses, so that the distance measuring apparatus can be easily downsized and inexpensive.

Second Modified Example of First Embodiment

In the first embodiment, the explanation was given of a case in which the DOE 130 has the plurality of diffractive regions 130a to 130k in the x-axis direction. The DOE 130 may further have a plurality of diffractive regions (y-diffractive regions) 130p to 130z in the y-axis direction, and the diffractive regions 130p to 130z may change, as shown in FIG. 4C, the traveling direction of incident light going advance in the z-axis direction into a direction in which the more a diffractive region has a start point distant from the origin in the positive direction of the y-axis, the smaller the x coordinate of an end point becomes and the smaller the y coordinate thereof becomes than the y coordinate of the start point (or a direction in which the larger the x coordinate of the end point becomes and the smaller the y coordinate of the end point becomes than the y coordinate of the start point). In this case, the projected light spot projected by beam having the traveling direction changed is rotated counterclockwise (or clockwise) as becoming apart from the DOE 130.

According to this configuration, the diffractive grating formed in the DOE 130 changes the traveling direction of the parallel light going advance in the z-axis direction while forming a flat plane parallel to the y-axis so that a rotation angle between the flat plane and the y-axis becomes a predetermined angle at a location advanced in the z-axis direction by a predetermined distance. Hence, even though the DOE 130 is small in size and inexpensive in comparison with, for example, a cylindrical lens, when parallel light (parallel beam) forming a flat plane parallel to the y-axis enters the DOE 130, the DOE 130 can emit flat light (i.e., twisted beam), a rotation angle of the flat plane relative to the y-axis of which changes in accordance with the distance from the DOE 130. Accordingly, the DOE 130 can change a rotation angle of, with the y-axis, the projected light spot in the shape of a line segment formed by emitted light to the object subjected to a distance measurement in accordance with the distance from the DOE 130. Therefore, according to the above-explained configuration, even though the distance measuring apparatus 100 is small in size and inexpensive, a distance to the object can be measured with the same precision as that of the related art.

Moreover, according to the above-explained configuration, in the DOE 130, the diffractive region among the diffractive regions 130p to 130z of the DOE 130 formed at a location more distant from the origin in the positive direction of the y-axis direction can change the traveling direction of the incident light (the incident beam) going advance in the z-axis direction into a direction in which the x coordinate of the end point becomes smaller. Accordingly, when parallel light forming a flat plane parallel to the y-axis and having a predetermined width enters the DOE 130, the DOE 130 can emit flat light, a difference in the x coordinate value at both ends of the flat plane of which changes in accordance with the distance from the DOE 130. Since the difference in the x coordinate value at both ends of the projected light spot in the shape of a line segment formed by emitted light to the object subjected to a distance measurement can be changed in accordance with the distance from the DOE 130, even though the distance measuring apparatus 100 is small in size and inexpensive, the distance measuring apparatus 100 can measure a distance to the object based on the difference in the x coordinate value at both ends of the projected light spot. In particular, when parallel light forming a flat plane parallel to the y-axis and having a predetermined width enters the DOE 130, the DOE 130 can emit flat light, the difference in the x coordinate value at both ends of the flat plane of which increases as the distance from the DOE 130 becomes long. Therefore, even if the distance from the DOE 130 becomes long, and, for example, the projected light spot represented in the picked-up image becomes small, the distance measuring apparatus 100 can measure the distance to the object precisely since the difference in the x coordinate value at both ends of the projected light spot increases.

Furthermore, according to the above-explained configuration, in the DOE 130, the diffractive region among the diffractive regions 130p to 130z of the DOE 130 formed at a location more distant from the origin in the y-axis direction can change the traveling direction of incident light (incident beam) going advance in the z-axis direction into a direction in which the x coordinate of the end point becomes large and the y coordinate thereof becomes smaller than that of the start point, or a direction in which the x coordinate becomes small and the y coordinate of the end point becomes smaller than that of the start point. Hence, when parallel light forming a flat plane parallel to the y-axis and having a predetermined width enters the DOE 130, the DOE 130 can emit flat light, differences in both y coordinate value and x coordinate value at both ends of the flat plane of which changes in accordance with the distance from the DOE 130. Accordingly, even though the distance measuring apparatus 100 is small in size and inexpensive, the distance measuring apparatus 100 can measure a distance to the object based on both of the difference in the y coordinate value and the difference in the x coordinate value at both ends of the projected light spot. In particular, when parallel light forming a flat plane parallel to the y-axis and having a predetermined width enters the DOE 130, the DOE 130 can emit flat light, the difference in the y coordinate value at both ends of the flat plane of which decreases and the difference in the x coordinate value at both ends of the flat plane of which decreases as the distance from the DOE 130 becomes long. Therefore, even if the distance from the DOE 130 becomes long, and, for example, the projected light spot represented in the picked-up image becomes small, the distance measuring apparatus 100 can measure the distance to the object precisely since the ratio of the difference in the x coordinate value relative to the difference in the y coordinate value at both ends of the projected light spot increases (i.e., the ratio of the difference in the y coordinate value relative to the difference in the x coordinate value decreases).

Third Modified Example of First Embodiment

In the present embodiment, the explanation was given of a case in which the distance measuring apparatus 100 is loaded in the projector 190 and the projector 190 puts a focal point on the screen based on a distance thereto measured by the distance measuring apparatus 100. The present invention is, however, not limited to this configuration, and for example, the distance measuring apparatus 100 may be loaded in a motion capture, and the motion capture may obtain a motion of an object based on a change in a distance to the object measured by the distance measuring apparatus 100. This corresponds to a gesture recognition by a computer gaming machine. Moreover, the distance measuring apparatus 100 may be built in, for example, a robot in order to function as a visual sensor thereof. Furthermore, the distance measuring apparatus 100 may be built in a detection sensor that detects an object like a human body, and the detection sensor may detect the presence of a person or an object when a distance to the object measured by the distance measuring apparatus 100 becomes closer beyond a predetermined value.

Second Embodiment

Figure 7:
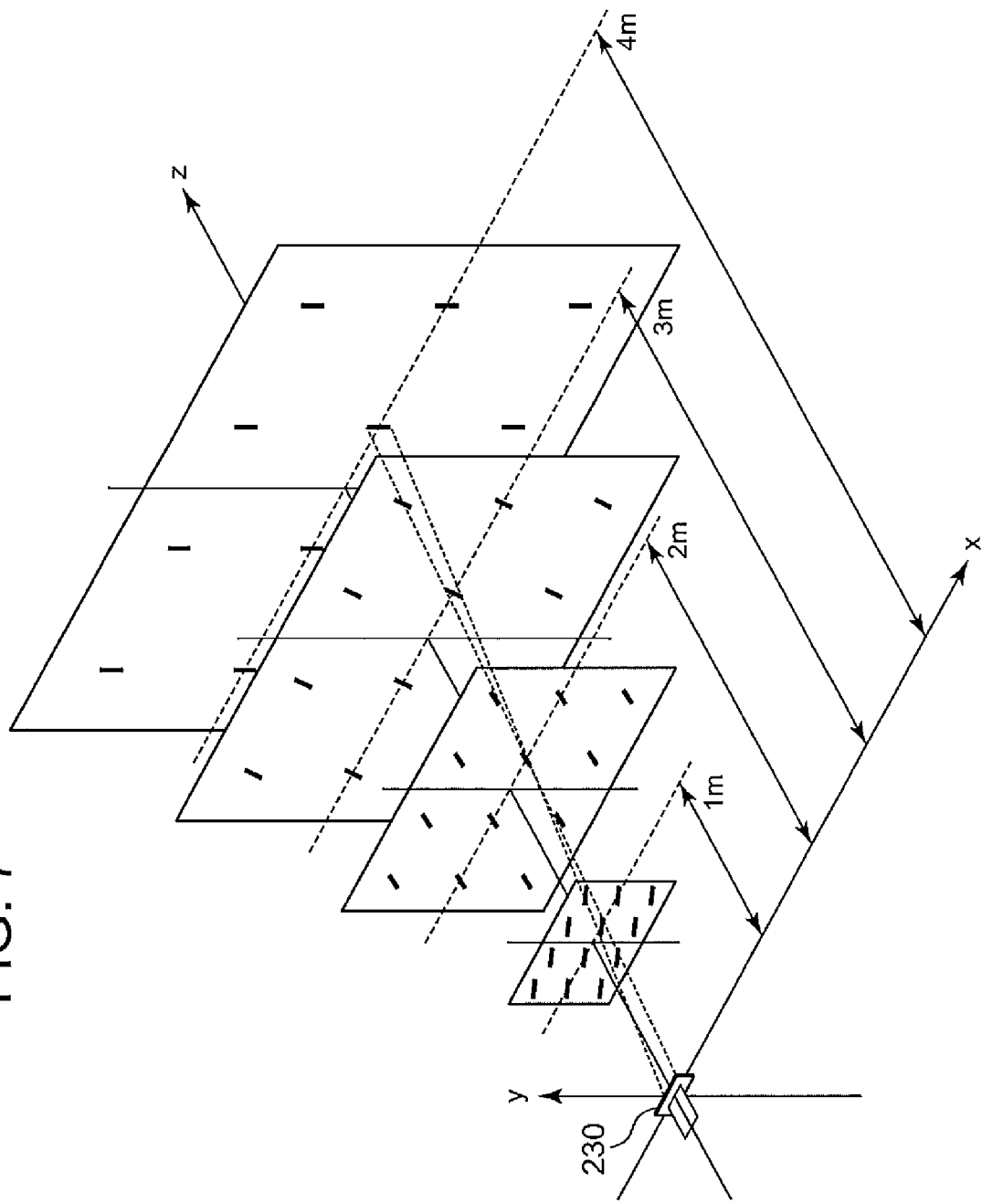
FIG. 7 is a diagram showing illustrative twisted beam emitted from a diffractive optical element according to a second embodiment.

Next, an explanation will be given of a second embodiment. As shown in FIG. 7, a distance measuring apparatus 200 according to the second embodiment of this invention includes a DOE 203 formed with multi-point divergence diffractive gratings that cause one incident flat beam to diverge into twelve twisted beams. The distance measuring apparatus 200 measures respective distances between twelve points on projected light spots formed on an object based on respective tilting of the twelve projected light spots formed on the object by the twelve twisted beams. Note that explanation for the same structural element as that of the first embodiment will be omitted below.

As shown in FIG. 8A, like the distance measuring apparatus 100 of the first embodiment, the distance measuring apparatus 200 of the second embodiment includes a control unit 210, a parallel-light generating unit 220, the DOE 230, and an image pickup unit 240, and is loaded in a projector 290 including an input unit 291 and a projecting unit 292. Explanation for the parallel-light generating unit 220 and the image pickup unit 240 will be omitted. Moreover, explanations will be given of the DOE 230 prior to the explanation of the control unit 210.

Figure 9A:
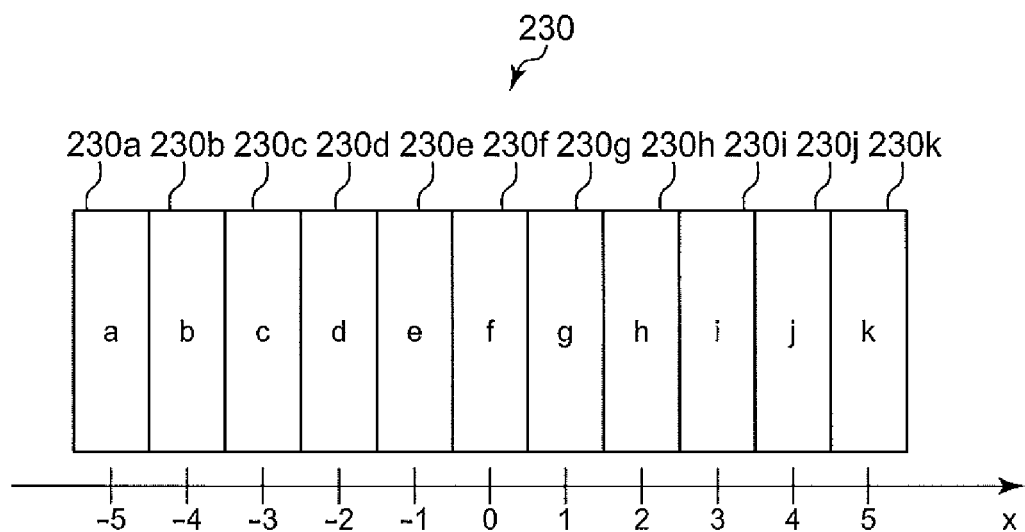
FIG. 9A is a diagram showing an illustrative diffractive optical element according to the second embodiment.

As shown in FIG. 9A, the DOE 230 includes eleven diffractive regions 230a to 230k arranged side by side in the x direction. An explanation will be given of a diffractive region 230f formed at the location of an origin prior to explanations of diffractive regions 230a to 230e, and 230g to 230k.

Figures 9B, 9C:
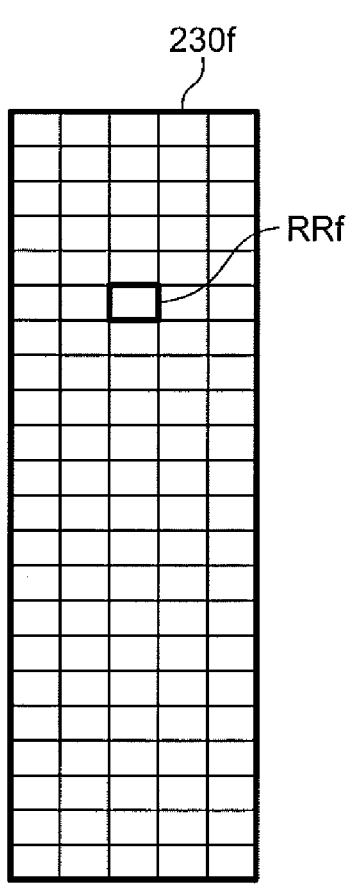
FIG. 9B is a diagram showing an illustrative configuration of a diffractive region of the diffractive optical element according to the second embodiment.
FIG. 9C is a diagram showing an illustrative repeating region.

As shown in FIG. 9B, a plurality of repeated regions RRf are formed at the diffractive region 230f in a tiled manner (i.e., so as to adjoin one another). The repeated regions RRf are arranged at a pitch that is sufficiently smaller than the diameter of laser beam normally emitted. As shown in FIG. 9C, twelve element regions Af to Lf are arranged at the repeated region RRf in a tiled manner. As shown in FIG. 10A, twelve kinds of diffractive gratings having different directions of beam emitted when laser beam going advance in the z-axis direction enters thereto are formed at respective element regions Af to Lf configuring the repeated region RRf.

More specifically, as shown in FIGS. 10A and 10C, when a start point is an origin, the element region Af changes the traveling direction of emitted laser beam into a direction toward an end point EAf represented by coordinate values (−1500, 1000, 4000) shown in FIGS. 10B and 10C. Likewise, the element region Bf changes the traveling direction of emitted laser beam into a direction toward an end point EBf represented by coordinate values (−500, 1000, 4000) when a start point is the origin. Furthermore, the element regions Cf and Df change the traveling direction of laser beam into directions toward end points ECf and EDf, respectively, which correspond to the points shifted by "1000" and "2000" with the x coordinate value of the end point EBf.

Moreover, the element regions Ef to Hf change the traveling direction of laser beam into respective directions toward respective end points EEf to EHf which correspond to the points shifted by "−1000" with the y coordinate value of the end points EAf to EDf. Furthermore, the element regions If to Lf change the traveling direction of laser beam into respective directions toward respective end points EIf to ELf which correspond to the points shifted by "−2000" with the y coordinate value of the end points EAf to EDf.

The diffractive regions 230a to 230e and 230g to 230k have a plurality of unillustrated repeated regions RRa to RRe and RRg to RRk, respectively, like the diffractive region 230f already explained. The repeated regions RRa to RRe and RRg to RRk have unillustrated element regions Aa to La, Ab to Lb, Ac to Lc, Ad to Ld, Ae to Le, Ag to Lg, Ah to Lh, Ai to Li, Aj to Lj, and Ak to Lk, respectively.

In order to identify those regions Aa to Lk, a diffractive region index and an element region index shown in the table of FIG. 11A are used. The diffractive region index is for identifying a diffractive region including an element region. For example, the element region Aa is included in the diffractive region 230a, so that the diffractive region index of the element region Aa is "a". Moreover, the element region Ab is included in the diffractive region 230b, so that the diffractive index of the element region Ab is "b". Furthermore, the element region index is for identifying the location of the element region in the repeated region. For example, the location of the element region Aa corresponds to the element region Af in the repeated region RRf shown in FIG. 9C, so that the element region index of the element region Aa is "A". Moreover, the location of the element region Ba corresponds to the element region Bf in the repeated region RRf shown in FIG. 9C, so that the element region index of the element region Ba is "B".

When those diffractive region index and element region index are used, respective start points of the element regions Aa to Lk can be expressed by an x coordinate value, a y coordinate value, and a z coordinate value shown in FIGS. 11B to 11D. That is, the locations of the respective start points of the regions Aa to Lk can be expressed as coordinate values (−5, 0, 0) to (5, 0, 0), respectively.

Moreover, respective end points of laser beam passing through respective regions Aa to Lk can be represented by an x coordinate value, a y coordinate value, and a z coordinate value shown n FIGS. 12A to 12C. That is, as shown in FIG. 12A, the element regions identified by the same element region index (i.e., the element regions having the same relative position in the repeated region) change the traveling direction of incident beam into a direction toward respective end points having the same x coordinate value even though the diffractive region index differs (i.e., the diffractive region including the element region differs). Hence, the x coordinate value representing the locations of respective end points of the element regions Aa to Lk is any one of following four coordinate values: "−1500"; "−500"; "+500"; and "+1500".

In contrast, as shown in FIG. 12B, regarding the element regions identified by the same element region index, it changes the traveling direction of incident beam into a direction toward an end point so that the later the diffractive region index is in an alphabet order (i.e., the larger the x coordinate of the start point becomes as shown in FIG. 11B), the larger the y coordinate value of such an end point becomes. Accordingly, the y coordinate values representing respective end points of the element regions Aa to Lk are included in any one of three coordinate ranges: "from 995 to 1005"; "from −5 to +5"; and "from −1005 to −995".

Therefore, according to the above-explained configuration, when parallel beam forming a flat plane parallel to the x-axis enters the DOE 230, the DOE 230 emits twisted beam that changes a rotation angle of the flat plane relative to the x-axis in accordance with the distance from the DOE 230 and splits such beam into at least four directions: a direction in which the x coordinate of the end point becomes "−1500"; a direction in which it becomes "−500"; a direction in which it becomes "+500"; and a direction in which it becomes "+1500".

Moreover, according to the above-explained configuration, when parallel beam forming a flat plane parallel to the x-axis enters the DOE 230, the DOE 230 can emit twisted beam, a rotation angle of the flat plane relative to the x-axis of which changes in accordance with the distance from the DOE 230 and can split such beam into at least three directions: a direction in which the y coordinate of the end point is included in a range "from 995 to 1005"; a direction in which it is in a range "from −5 to +5"; and a direction in which it is in a range "from −1005 to −995".

That is, respective end points of the element regions Aa to Lk are classified into twelve patterns based on the x coordinate of the end point and the y coordinate thereof. Hence, when, as shown in FIG. 7, coherent parallel beam forming a flat plane parallel to the x-axis enters the DOE 230, the DOE 230 can emit twelve counterclockwise twisted beams into twelve directions.

A difference in the x coordinate between a start point and an end point (i.e., a direction ratio) in each of the element regions Aa to Lk, a difference in the y coordinate, and a difference in the z coordinate become values shown in FIGS. 13A to 13C, so that direction cosines l, m, and n calculated using those differences become values shown in FIGS. 14A, 14B and 15.

Next, with reference to FIG. 8A again, the explanation for the distance measuring apparatus 200 of the second embodiment will be continued. The control unit 210 shown in FIG. 8A executes an image projecting process shown in FIG. 16, thereby functions as not only a projected-light control unit 211, an image-pickup control unit 212, a picked-up-image obtaining unit 213, a projected-light-spot detecting unit 214, a tilting detecting unit 215, an information memory unit 216, a distance measuring unit 217, and a projection control unit 219, but also a range image generating unit 218a and a projected-image correcting unit 218b as shown in FIG. 8B.

Figure 16:
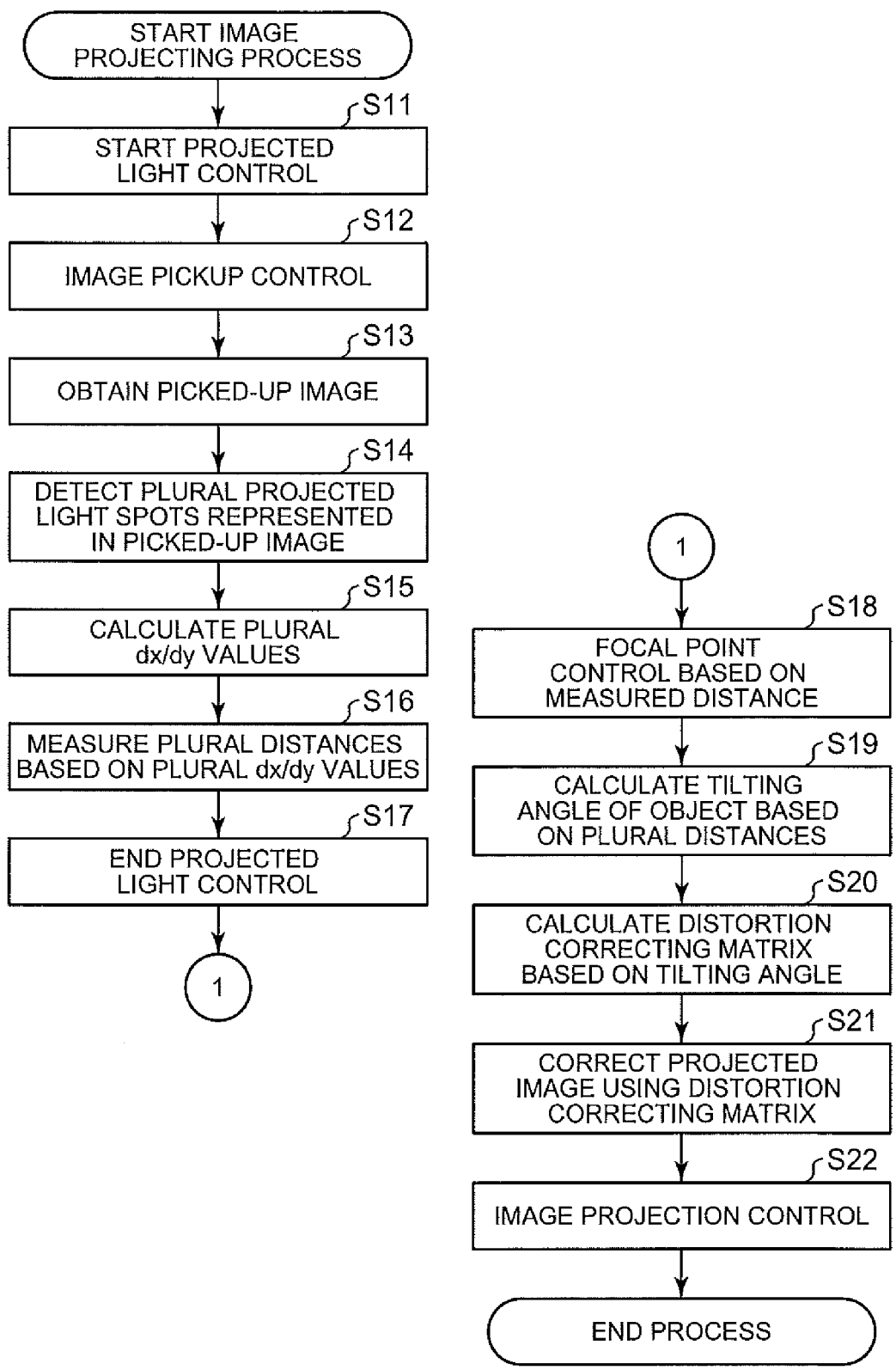
FIG. 16 is a flowchart showing an illustrative image projecting process executed by a control unit of the distance measuring apparatus according to the second embodiment.

Upon starting of the image projecting process shown in FIG. 16, the projected-light control unit 211 starts a projected light control, and projects twelve twisted beams on an object (step S11). Next, the image-pickup control unit 212 executes an image pickup control and causes the image pickup unit 240 shown in FIG. 8A to pick up twelve projected light spots formed on the object (step S12). Thereafter, the picked-up-image obtaining unit 213 obtains a picked-up image from the image pickup unit 240 (step S13).

Next, the projected-light-spot detecting unit 214 detects twelve projected light spots represented in the picked-up image based on the brightness of pixels configuring the picked-up image (step S14). Next, the tilting detecting unit 215 calculates a dx/dy value for each of the twelve projected light spots detected (step S15).

Next, the distance measuring unit 217 searches an inverse number of a distance associated with each of the twelve dx/dy values calculated in the step S15 from the above-explained distance table stored in the information memory unit 216, and calculates an inverse number of the searched value, thereby measuring a distance to each of twelve points where the projected light spots are formed on the object (step S16). The range image generating unit 218a generates a range image having twelve measured distances as pixel values. Thereafter, the projected-light control unit 211 terminates the projected light control (step S17).

Next, the projection control unit 219 performs focal point control of controlling the projecting unit 292 shown in FIG. 8A so that the focal point is put on a screen that is the object based on a distance to a point located at the innermost center among distances (i.e., distances represented by range images) to twelve points on the object measured in the step S16 (step S18). Thereafter, the projection control unit 219 calculates a tilting angle of the screen relative to an optical axis of the projecting unit 292 based on the measured distances to the twelve points (step S19). More specifically, the tilting angle of the screen calculated in the step S09 includes an angle between the horizontal direction of the screen and the optical axis of the projecting unit 292 and an angle between the vertical direction of the screen and the optical axis of the projecting unit 292.

Next, the projected-image correcting unit 218b calculates a distortion correcting matrix that cancels the distortion of the image projected on the screen using the tilting angle calculated in the step S09 (step S20). As a specific example, the projected-image correcting unit 218b calculates a correcting matrix which is disclosed in Japan Patent No. 4380557 and which performs trapezoidal correction. Next, the projected-image correcting unit 218b corrects the projected image projected on the screen using the correcting matrix calculated in the step S20 (step S21). Thereafter, the projection control unit 219 performs projection control of projecting the corrected projected image on the screen (step S22), and terminates execution of the image projecting process.

According to this configuration, the distance measuring apparatus 200 measures distances to a plurality of points where projected light spots are formed on the object based on respective tilting of the plurality of projected light spots to the x-axis formed on the object by parallel beams split by the DOE 230. Accordingly, the distance measuring apparatus 200 needs no CMOS (Complementary Metal Oxide Semiconductor) sensor or an MEMS (Micro Electro Mechanical Systems) scanner like a TOF (Time of Flight) sensor that is special and expensive. Therefore, even though the distance measuring apparatus 200 is small in size and inexpensive, the distance measuring apparatus 200 can measure respective distances to the plurality of points on the object and can generate range images.

First Modified Example of Second Embodiment

In the second embodiment, the explanation was given of a case in which regarding the element regions identified by the same element region index which are of the repeated regions RRa to RRk of the DOE 230, it changes the traveling direction of incident beam into a direction toward an end point so that the later the diffractive region index becomes in an alphabet order (i.e., the larger the x coordinate of the start point becomes), the larger the y coordinate value of such an end point becomes, and a plurality of counterclockwise twisted beams are emitted.

The present invention is, however, not limited to this case, and the DOE 230 may have right repeated regions RRa' to RRk' instead of the repeated regions RRa to RRk (hereinafter, referred to as left repeated regions RRa to RRk). Regarding the element regions identified by the same element region index which are of the right repeated regions RRa' to RRk', it may change the traveling direction of incident beam into a direction toward an end point so that the later the diffractive region index becomes in an alphabet order (i.e., the larger the x coordinate of the start point becomes as shown in FIG. 11B), the smaller the y coordinate value of such an end point becomes, and a plurality of clockwise twisted beams may be emitted.

Second Modified Example of Second Embodiment

In the first modified example of the second embodiment and the second embodiment, when parallel beam forming a flat plane parallel to the x-axis enters the DOE 230, the DOE 230 may emit clockwise or counterclockwise twisted beam, a rotation angle of the flat plane relative to the x-axis of which changes in accordance with the distance from the DOE 230 and may split such twisted beam into at least four directions in which the x coordinate of the end points becomes "−1500", "−500", "+500", and "+1500". In this configuration, the explanation was given of a case in which when parallel beam forming a flat plane parallel to the x-axis enters the DOE 230, the DOE 230 emits clockwise or counterclockwise twisted beam, a rotation angle of the flat plane relative to the x-axis of which changes in accordance with the distance from the DOE 230 and splits such twisted beam into at least three directions in which the y coordinate of the end point is included in a range "from 995 to 1005", a range "from −5 to +5", and a range "from −1005 to −995".

The present invention is, however, not limited to this case, and when parallel beam forming a flat plane parallel to the y-axis enters the DOE 230, the DOE 230 may emit clockwise or counterclockwise twisted beam, a rotation angle of the flat plane relative to the y-axis of which changes in accordance with the distance from the DOE 230 and may split such twisted beam into at least four directions in which the y coordinate of the end point becomes "−1500", "−500", "+500", and "+1500". In this configuration, when parallel beam forming a flat plane parallel to the y-axis enters the DOE 230, the DOE 230 may emit clockwise or counterclockwise twisted beam, a rotation angle of the flat plane relative to the y-axis of which changes in accordance with the distance from the DOE 230 and may split such twisted beam into at least three directions in which the x coordinate of the end point is included in a range "from 995 to 1005", a range "from −5 to +5", and a range "from −1005 to −995".

Third Embodiment

Figure 17:
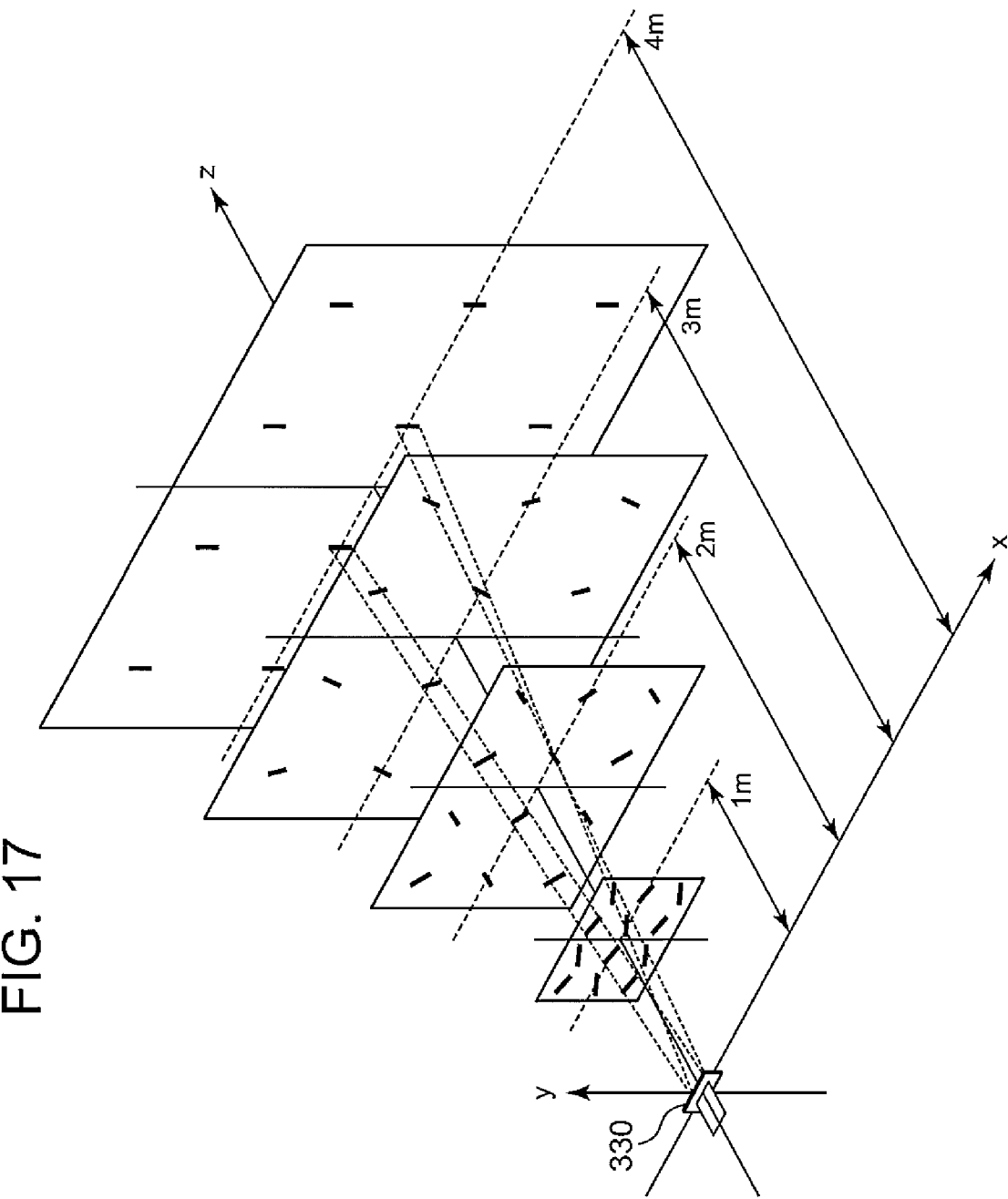
FIG. 17 is a diagram showing illustrative twisted beam emitted from a diffractive optical element according to a third embodiment.
Figure 18A:
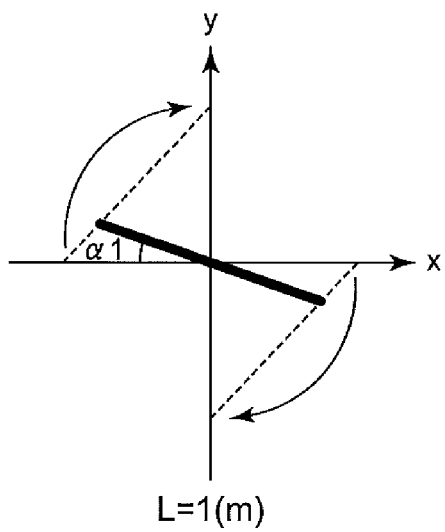
FIG. 18A is a diagram showing an illustrative right projected light spot projected on a projection plane distant from the diffractive optical element by a distance "1 m" according to the third embodiment.
Figure 18B:
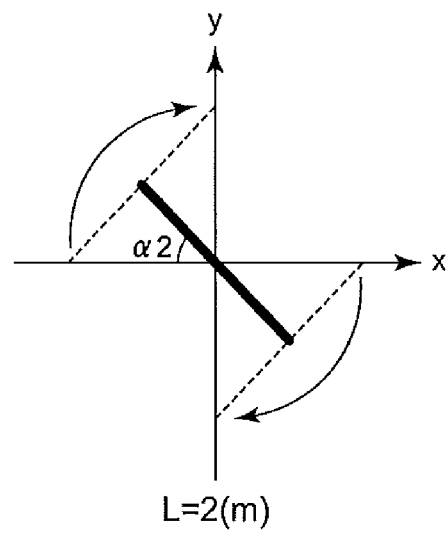
FIG. 18B is a diagram showing an illustrative right projected light spot projected on a projection plane distant from the diffractive optical element by a distance "2 m" according to the third embodiment.
Figure 18C:
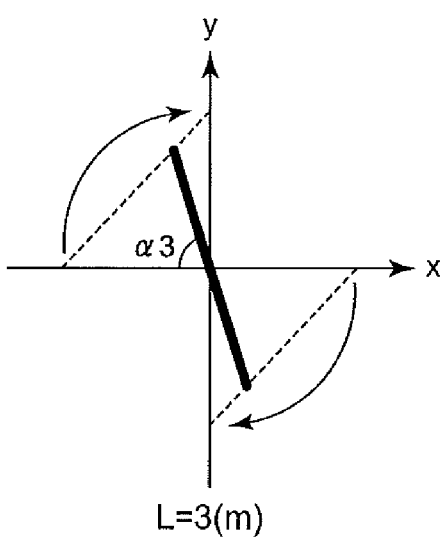
FIG. 18C is a diagram showing an illustrative right projected light spot projected on a projection plane distant from the diffractive optical element by a distance "3 m" according to the third embodiment.
Figure 18D:
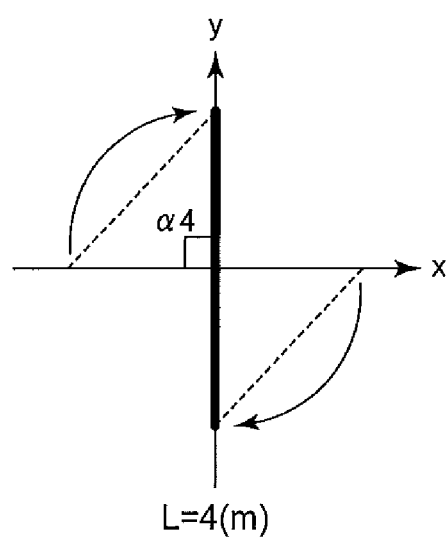
FIG. 18D is a diagram showing an illustrative right projected light spot projected on a projection plane distant from the diffractive optical element by a distance "4 m" according to the third embodiment.
Figure 19A:
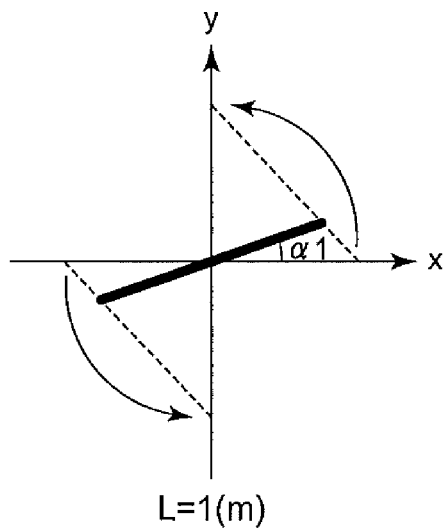
FIG. 19A is a diagram showing an illustrative left projected light spot projected on a projection plane distant from the diffractive optical element by a distance "1 m" according to the third embodiment.
Figure 19B:
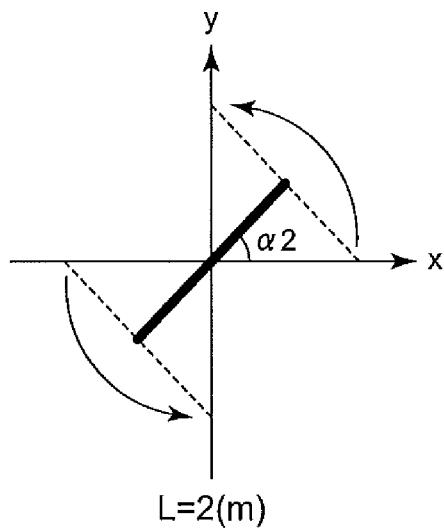
FIG. 19B is a diagram showing an illustrative left projected light spot projected on a projection plane distant from the diffractive optical element by a distance "2 m" according to the third embodiment.
Figure 19C:
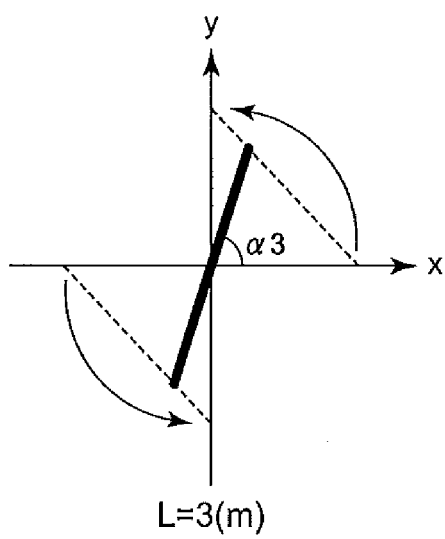
FIG. 19C is a diagram showing an illustrative left projected light spot projected on a projection plane distant from the diffractive optical element by a distance "3 m" according to the third embodiment.
Figure 19D:
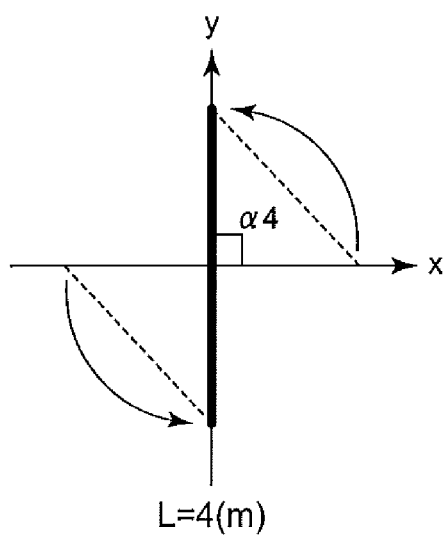
FIG. 19D is a diagram showing an illustrative left projected light spot projected on a projection plane distant from the diffractive optical element by a distance "4 m" according to the third embodiment.

Next, an explanation will be given of a third embodiment. As shown in FIG. 17, a distance measuring apparatus 300 according to the third embodiment of the present invention splits one flat beam into six right twisted beams and six left twisted beams using a DOE 330.

The right twisted beam emitted by the DOE 330 has a flat plane twisted in the right direction (i.e., clockwise direction) at a predetermined rate toward the traveling direction of the beam. Hence, as shown in FIGS. 18A to 18D, the projected light spot of the right twisted beam (hereinafter referred to as a right projected light spot) rotates clockwise at a predetermined rate and an angle relative to the positive direction of the x-axis decreases from 180 degrees to 90 degrees as the right twisted beam goes advance.

In contrast, the left twisted beam emitted by the DOE 330 has a flat plane twisted in the left direction (i.e., counterclockwise direction) at the same rate as that of the right twisted beam toward the traveling direction of the beam. Hence, as shown in FIGS. 19A to 19D, the projected light spot of the left twisted beam (hereinafter referred to as a left projected light spot) rotates counterclockwise at the same rate as that of the right twisted beam and an angle relative to the positive direction of the x-axis increases from zero degree to 90 degrees as the left twisted beam goes advance.

The distance measuring apparatus 300 of the third embodiment detects six right projected light spots and six left projected light spots, corrects tilting of twelve projected light spots using a combination of a detected tilting of a right projected light spot and a detected tilting of a left projected light spot, and measures respective distances to twelve points on an object based on the corrected tilting. Note that explanation for the same structural element as that of the second embodiment will be omitted in the present embodiment.

The distance measuring apparatus 300 of the third embodiment includes, like the distance measuring apparatus 200 of the second embodiment, as shown in FIG. 20A, a control unit 310, a parallel-light generating unit 320, a DOE 330, and an image pickup unit 340, and is loaded in a projector 390 that includes an input unit 391 and a projecting unit 392.

The control unit 310 shown in FIG. 20A executes an image projecting process shown in FIG. 21A, thereby functioning as not only a projected-light control unit 311, an image-pickup control unit 312, a picked-up-image obtaining unit 313, a projected-light-spot detecting unit 314, a tilting detecting unit 315a, an information memory unit 316, a distance measuring unit 317, a range image generating unit 318a, a projected-image correcting unit 318b and a projection control unit 319 but also an error eliminating unit 315b as shown in FIG. 20B.

Upon starting of the image projecting process shown in FIG. 21A, the projected-light control unit 311, the image-pickup control unit 312, the picked-up-image obtaining unit 313, the projected-light-spot detecting unit 314 and the tilting detecting unit 315a shown in FIG. 20B execute the same processes as those shown in FIG. 16 from the step S11 to the step S15 (steps S31 to S35). Next, the error eliminating unit 315b executes an error eliminating process shown in FIG. 21B for eliminating an error from a dx/dy value representing a tilting detected in the step S35.

Upon starting of the image projecting process shown in FIG. 21A, the error eliminating unit 315b calculates respective tilting angles of twelve projected light spots relative to the positive direction of the x-axis using twelve dx/dy values (step S51). As a specific example, the error eliminating unit 315b calculates a tangent from a dx/dy value, and then calculates a tilting angle of a projected light spot using an arc tangent function.

Next, the error eliminating unit 315b selects a right projected light spot from six right projected light spots, and specifies a left projected light spot having a distance closest to the selected right projected light spot in a picked-up image. Thereafter, the error eliminating unit 315b obtains a combination of the right projected light spot and the left projected light spot with the selected right projected light spot and the specified left projected light spot being taken as a pair (step S52).

The flat plane of the right twisted beam emitted by the DOE 330 is twisted in a reverse direction (i.e., clockwise) to the left twisted beam at the same rate as that of the flat plane of the left twisted beam, so that if the main scanning direction of the image pickup unit 340 shown in FIG. 20A is parallel to the x-axis without an error, the tilting angle of the right projected light spot and that of the left projected light spot can be expressed by a following formula (1).

Tilting angle of right projected light spot=180 degrees−tilting angle of left projected light spot    (1)

Accordingly, an error (hereinafter, referred to as a parallel level error) in the parallel level between the main scanning direction of the image pickup unit 340 and the x-axis can be expressed by a following formula (2) when it is expressed by an angle between the main scanning direction and the positive direction of the x-axis.

Parallel level error=tilting angle of right projected light spot−(180 degrees−tilting angle of left projected light spot)    (2)

Hence, the error eliminating unit 315b substitutes the tilting angle calculated in the step S51 into the above formula (2), thereby specifying the parallel level error (step S53). Thereafter, the error eliminating unit 315b eliminates the parallel level error from the tilting angle calculated in the step S51, and re-calculates respective dx/dy values of six right projected light spots and six left projected light spots using the tilting angle having the parallel level error eliminated (step S54). Thereafter, the error eliminating unit 315b terminates the error eliminating process.

After the process in the step S36 shown in FIG. 21A completes, the distance measuring unit 317 shown in FIG. 20B measures respective distances to twelve points where projected light spots on the object are formed using the twelve dx/dy values re-calculated in the step S54 shown in FIG. 21B (step S36). The range image generating unit 318a generates range images having the twelve distances measured as pixel values. Thereafter, the projected-light control unit 211 terminates the projected light control (step S37).

Thereafter, the projected-image correcting unit 318b and the projection control unit 319 execute the steps S39 to S43 which are the same processes as those of the steps S18 to S22 shown in FIG. 16, and terminate execution of the image projecting process.

According to the above-explained configuration, the error eliminating unit 315b eliminates respective detection errors from the detected tilting of the right projected light spot and that of the left projected light spot based on the detected tilting of the right projected light spot and that of the left projected light spot. Accordingly, even if, for example, there is an error between the main scanning direction of the image pickup unit 340 and the x-axis and when the diffractive direction of the DOE 230 contains an error, the distance measuring apparatus 300 can measure a distance to a point on the object precisely.

Fourth Embodiment

Figure 22:
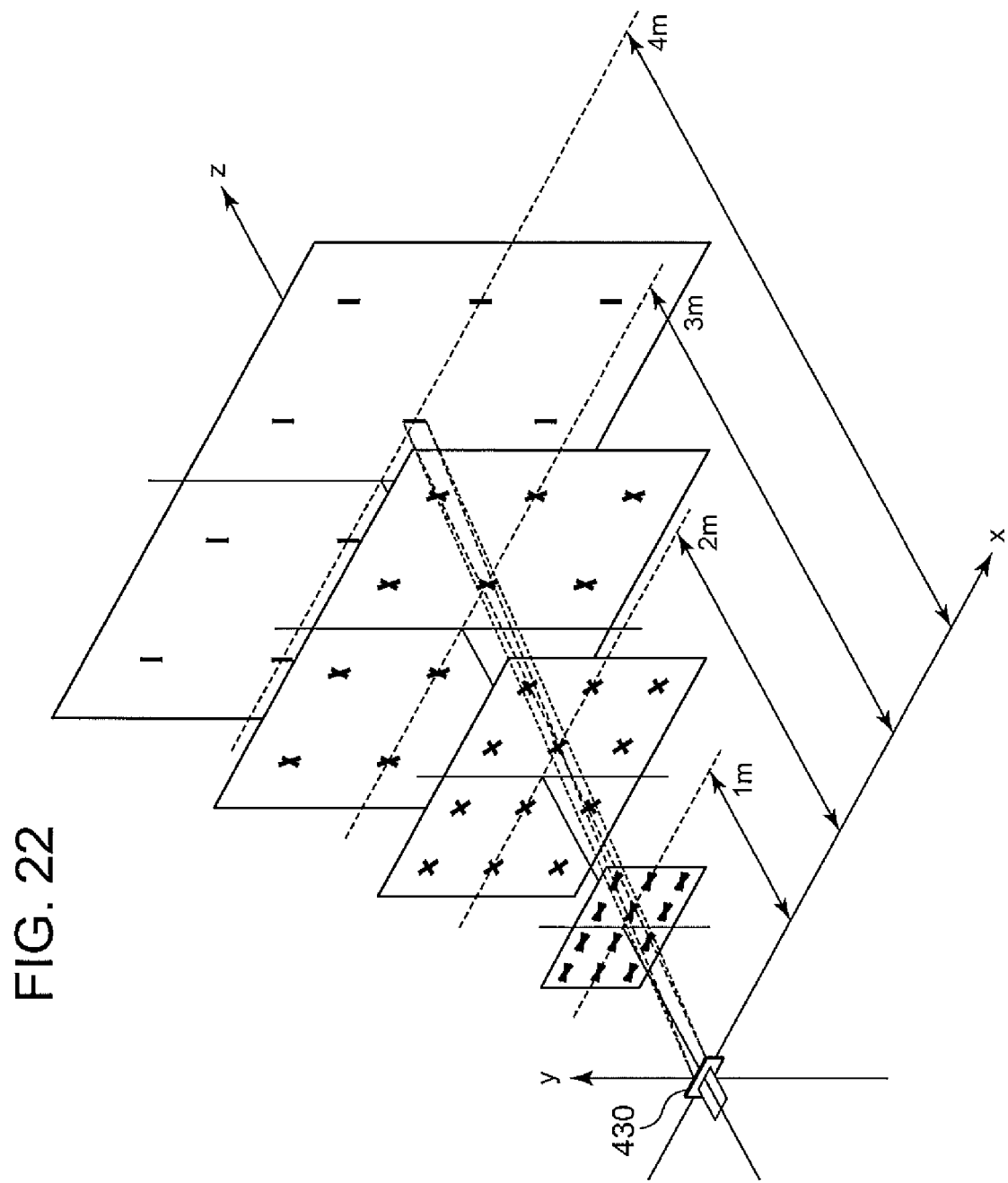
FIG. 22 is a diagram showing illustrative twisted beam emitted from a diffractive optical element according to a fourth embodiment.
Figure 23A:
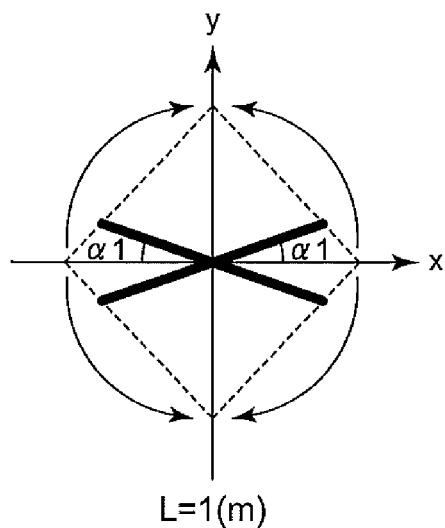
FIG. 23A is a diagram showing an illustrative right-and-left superimposed projected light spot projected on a projection plane distant from the diffractive optical element by a distance "1 m" according to the fourth embodiment.
Figure 23B:
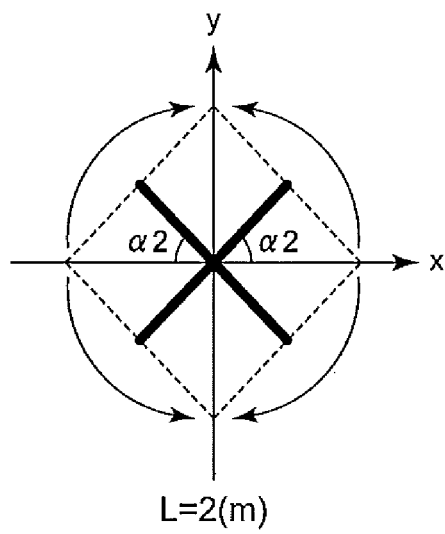
FIG. 23B is a diagram showing an illustrative right-and-left superimposed projected light spot projected on a projection plane distant from the diffractive optical element by a distance "2 m" according to the fourth embodiment.
Figure 23C:
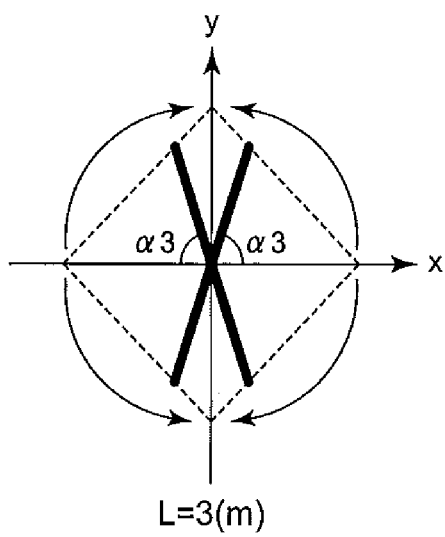
FIG. 23C is a diagram showing an illustrative right-and-left superimposed projected light spot projected on a projection plane distant from the diffractive optical element by a distance "3 m" according to the fourth embodiment.
Figure 23D:
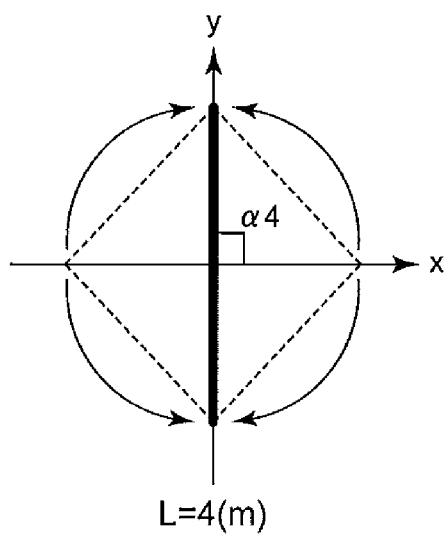
FIG. 23D is a diagram showing an illustrative right-and-left superimposed projected light spot projected on a projection plane distant from the diffractive optical element by a distance "4 m" according to the fourth embodiment.

Next, an explanation will be given of a fourth embodiment. As shown in FIG. 22, a distance measuring apparatus according to the fourth embodiment of the present invention splits a flat beam into twelve right-and-left superimposed twisted beams using a DOE 430. The right-and-left superimposed twisted beam emitted by the DOE 430 includes a right twisted beam and a left twisted beam superimposed with each other at a further position at which the split parallel light has traveled a further predetermined distance in the z-axis direction, and an angle of the projected light spot thereof (hereinafter, referred to as a right-and-left superimposed projected light spot) relative to the x-axis (or the y-axis) changes at a predetermined rate as the right-and-left superimposed twisted beam goes advance as shown in FIGS. 23A to 23D.

The two twisted beams (i.e., the right twisted beam and the left twisted beam) configuring the right-and-left superimposed twisted beam emitted by the DOE 430 have respective flat planes twisted in opposite directions to each other at the same predetermined rate like the third embodiment. Accordingly, the shape of the right-and-left superimposed projected light spot becomes always substantially linearly symmetrical relative to a straight line parallel to the y-axis, and this characteristic is utilized for parallel level correction.

Figure 24A:
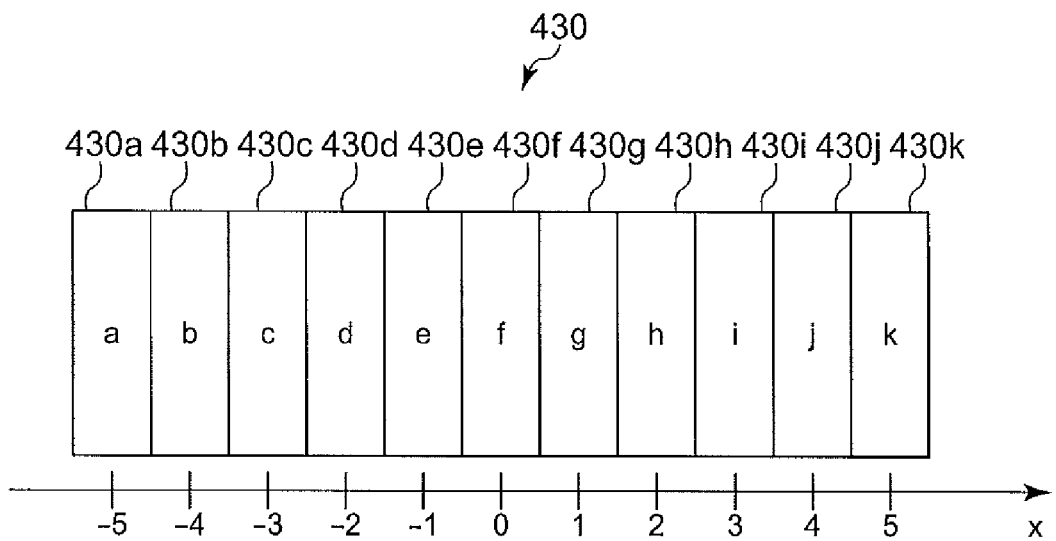
FIG. 24A is a diagram showing an illustrative diffractive optical element of the fourth embodiment.

As shown in FIG. 24A, the DOE 430 includes eleven diffractive regions 430a to 430k arranged side by side in the x direction. An explanation will be given of the diffractive region 430f formed at the location of the origin prior to explanations of the diffractive regions 430a to 430e and 430g to 430k.

Figures 24B, 24C, 24D:
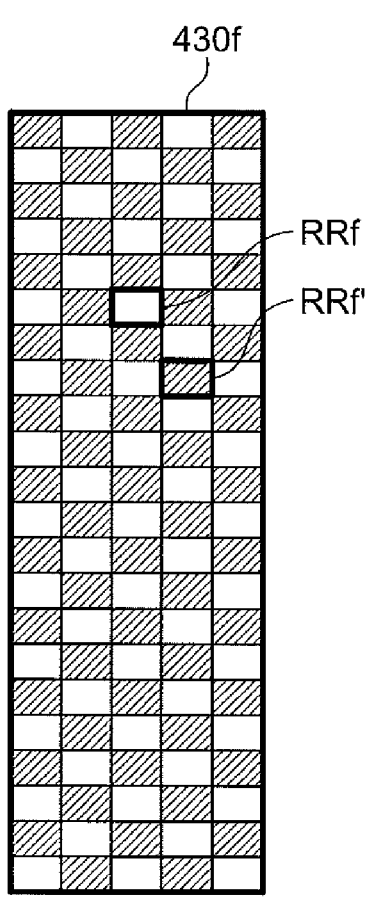
FIG. 24B is a diagram showing an illustrative configuration of a diffractive region of the diffractive optical element of the fourth embodiment.
FIG. 24C is a diagram showing an illustrative configuration of a left twisted-repeated region.
FIG. 24D is a diagram showing an illustrative configuration of a right twisted-repeated region.

As shown in FIG. 24B, a plurality of left repeated regions RRf for emitting left twisted beam explained in the second embodiment and a plurality of right repeated regions RRf' for emitting right twisted beam explained in the first modified example of the second embodiment are formed at the diffractive region 430f in a tiled manner at a predetermined rate. The left repeated regions RRf and the right repeated regions RRf' are arranged side by side at a pitch sufficiently smaller than the diameter of laser beam normally emitted. The explanation will be given of a case in which the left repeated region RRf and the right repeated region RRf' are alternately formed for each region (or for each several regions) (i.e., checkered pattern) in the x-axis direction and in the y-axis direction, but the present invention is not limited to this configuration. For example, the left repeated region RRf and the right repeated region RRf' may be alternately formed for each region (or for each several regions) only in the x-axis direction (i.e., like a stripe line), or may be alternately formed for each region (or for each several regions) only in the y-axis direction (i.e., like a border line).

Like the diffractive region 430f already explained, the diffractive regions 430a to 430e and 430g to 430k shown in FIG. 24A each has a plurality of unillustrated left repeated regions RRa to RRe and RRg to RRk and a plurality of unillustrated right repeated regions RRa' to RRe' and RRg' to RRk'.

According to the distance measuring apparatus of the third embodiment, the traveling direction of the right twisted beam forming a right projected light spot and the traveling direction of the left twisted beam which is the pair with the right twisted beam and which forms a left projected light spot are different from each other, so that a distance from the DOE 430 to the right projected light spot and a distance from the DOE 430 to the left projected light spot may differ from each other. In this case, parallel level correction is not carried out correctly in some cases. According to the configuration of the distance measuring apparatus of the fourth embodiment, however, the traveling direction of the right-and-left superimposed twisted beam forming the right-and-left superimposed projected light spot is one (i.e., the traveling direction of the left twisted beam and that of the right twisted beam configuring the right-and-left superimposed twisted beam are same or substantially same). Therefore, the distance from the DOE 430 to the right-and-left superimposed projected light spot is also one (i.e., the distance from the DOE 430 to the left projected light spot and the distance from the DOE 430 to the right projected light spot forming the right-and-left superimposed projected light spot are same or substantially same), so that parallel level correction can be precisely carried out in comparison with the third embodiment.

Fifth Embodiment

Figure 25:
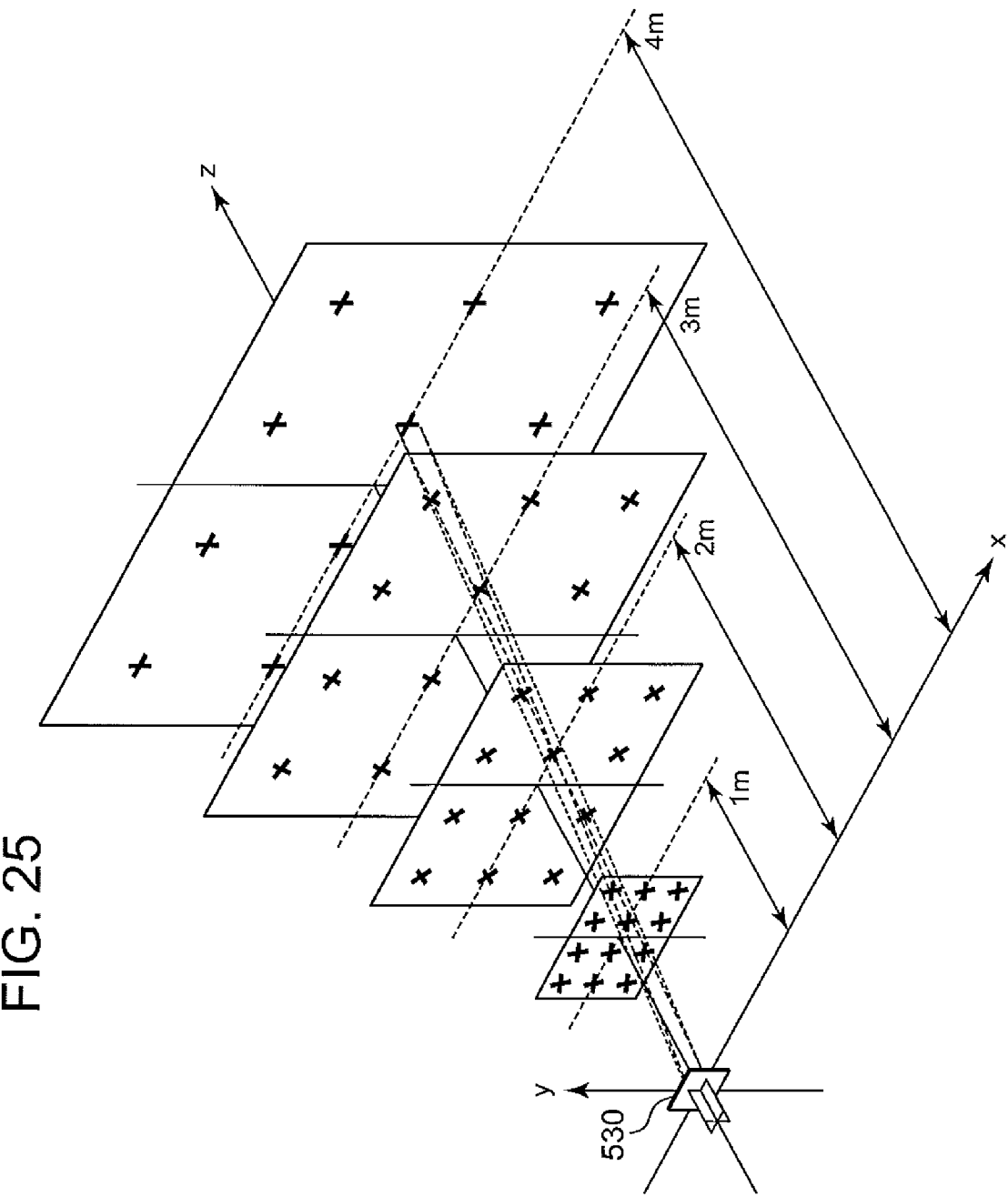
FIG. 25 is a diagram showing illustrative twisted beam emitted from a diffractive optical element according to a fifth embodiment.
Figure 26A:
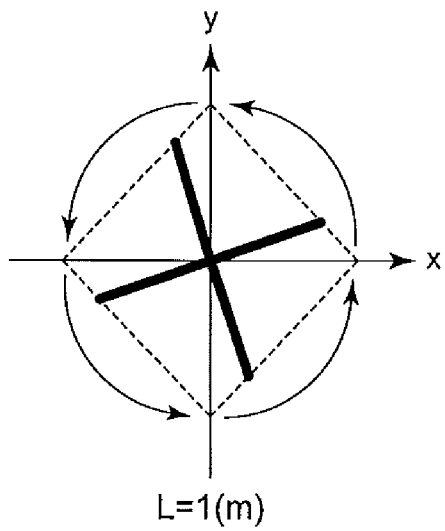
FIG. 26A is a diagram showing illustrative first left projected light spot and second left projected light spot projected on a projection plane distant from the diffractive optical element by a distance "1 m" according to the fifth embodiment.
Figure 26B:
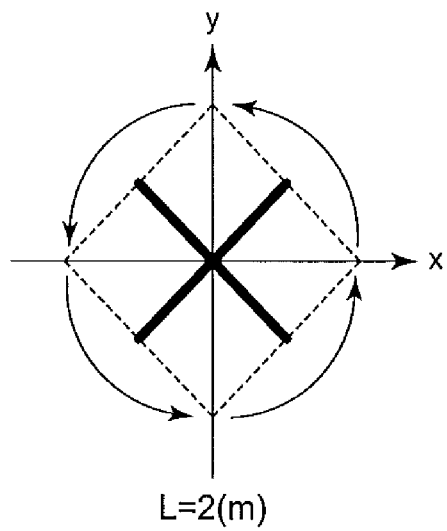
FIG. 26B is a diagram showing illustrative first left projected light spot and second left projected light spot projected on a projection plane distant from the diffractive optical element by a distance "2 m" according to the fifth embodiment.
Figure 26C:
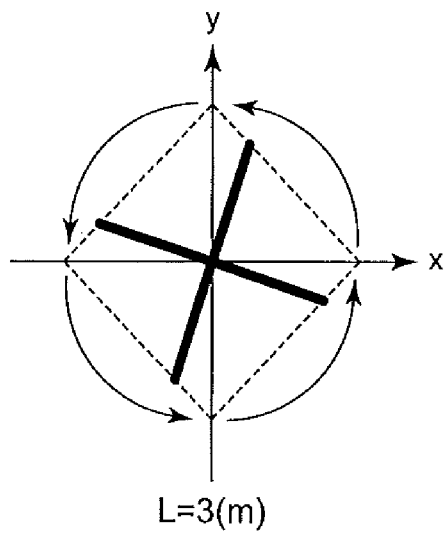
FIG. 26C is a diagram showing illustrative first left projected light spot and second left projected light spot projected on a projection plane distant from the diffractive optical element by a distance "3 m" according to the fifth embodiment.
Figure 26D:
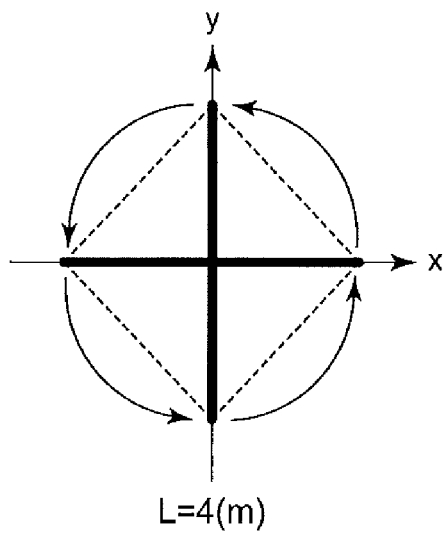
FIG. 26D is a diagram showing illustrative first left projected light spot and second left projected light spot projected on a projection plane distant from the diffractive optical element by a distance "4 m" according to the fifth embodiment.

Next, an explanation will be given of a fifth embodiment. A distance measuring apparatus according to the fifth embodiment of the present invention includes a parallel-light generating unit that generates, as shown in FIG. 25, flat beam which forms a flat plane parallel to the x-axis and which goes advance in the z-axis direction and flat beam which forms a flat plane parallel to the y-axis and which goes advance in the z-axis direction.

Moreover, the distance measuring apparatus of the fifth embodiment includes a DOE 530 which splits one flat beam forming a flat plane parallel to the x-axis into twelve left twisted beams (hereinafter, referred to as first left twisted beams) and splits one flat beam forming a flat plane parallel to the y-axis into twelve left twisted beams (hereinafter, referred to as second left twisted beams). The DOE 530 changes respective traveling directions of the first left twisted beams (or the second left twisted beams) into directions so as to be superimposed (e.g., intersected) on the second left twisted beams (or the first left twisted beams). Hence, even if a projected light plane is distant from the DOE 530 in the z-axis direction, as shown in FIGS. 26A to 26D, the projected light spot of the first left twisted beam (hereinafter, referred to as a first left projected light spot) and the projected light spot of the second left twisted beam (hereinafter, referred to as a second left projected light spot) are kept in a superimposed (intersecting) condition with each other. Moreover, the first left twisted beam and the second left twisted beam emitted by the DOE 530 have respective flat planes twisted in the same direction at the same predetermined rate, so that an angle between the first left projected light spot and the second left projected light spot remains same and does not change. The DOE 530 twists the parallel lights (the first left twisted beams and the second left twisted beams) orthogonal to each other, such that (i) an angle between one of first left twisted beams and the x-axis becomes a predetermined angle and (ii) the flat planes remain orthogonal to each other, at a position at which the parallel lights have traveled a predetermined distance in the z-axis direction.

Accordingly, when detecting the first left projected light spot (or the second left projected light spot) from a picked-up image, the distance measuring apparatus of the fifth embodiment detects the second left projected light spot (or the first left projected light spot) intersecting the detected projected light spot at a predetermined angle in the picked-up image.

According to this configuration, for example, unlike the fourth embodiment, an angle between the projected light spots superimposing with each other does not change depending on the distance between the projected light plane and the DOE 430, so that if only the first left projected light spot (or the second left projected light spot) can be detected, the distance measuring apparatus can easily detect the second left projected light spot (or the first left projected light spot).

Thereafter, the distance measuring apparatus of the fifth embodiment takes the first left projected light spot and the second left projected light spot superimposing with each other as a pair. Next, the distance measuring apparatus calculates a distance between a point on the first left projected light spot on an object and the DOE 530 based on the tilting of the first left projected light spot configuring the pair, and calculates a distance between a point on the second left projected light spot on the object and the DOE 530 configuring the pair. Next, an average value between the two distances is taken as a distance to an intersection between the first left projected light spot and the second left projected light spot from the DOE 530. Thereafter, the distance measuring apparatus calculates a distance to an intersection between each first left projected light spot and each second left projected light spot from the DOE 530 for each of the twelve pairs, thereby generating range images.

According to this configuration, the distance measuring apparatus measures a distance to an intersection of projected light spots on the object based on respective tilting of, relative to the x-axis, the two projected light spots intersecting with each other. Accordingly, in comparison with a case in which a distance is measured based on only a tilting of one projected light spot, the information amount used for a distance measurement becomes twice, so that the distance measuring apparatus can measure respective distances to the plurality of points on the object precisely.

A distance measuring apparatus employing a configuration beforehand for realizing the functions of the present invention can be provided, but an existing distance measuring apparatus can be caused to function as the distance measuring apparatus of the present invention by an application of a program. That is, if a distance measuring program that realizes respective functional configurations by the distance measuring apparatuses 100, 200, 300, etc., is applied so that a computer (e.g., a CPU) controlling the existing distance measuring apparatus can run such a program, the existing distance measuring apparatus can be caused to function as the distance measuring apparatuses 100, 200, 300, etc. Moreover, the distance measuring method of the present invention can be carried out using the distance measuring apparatuses 100, 200, 300, etc. of the present invention, exemplified in the above-explained embodiments.

How to distribute such a program is not limited to any particular scheme, and for example, such a program can be distributed in a manner being stored in a recording medium, such as a memory card, a CD-ROM, or a DVD-ROM, or can be distributed over a communication medium like the Internet.

Preferred embodiments of the present invention were explained above in detail, but the present invention is not limited to any particular embodiment, and can be changed and modified in various forms within the scope and spirit of the present invention.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A diffractive optical element comprising:
   a first diffractive grating that, in a coordinate space defined by an origin, an x-axis, a y-axis and a z-axis, twists x-incident light which is parallel light forming a flat plane parallel to the x-axis and advancing in a z-axis direction, such that an angle of the flat plane with respect to the x-axis becomes a predetermined angle at a position at which the x-incident light has traveled a predetermined distance in the z-axis direction,
   wherein the first diffractive grating includes a multi-point divergence diffractive grating that splits the x-incident light advancing in the z-axis direction into a plurality of parallel lights traveling in different directions from one another.

2. The diffractive optical element according to claim 1, wherein the diffractive optical element comprises a plurality of x-diffractive regions arranged along the x-axis, each x-diffractive region being formed with the first diffractive grating, and
   wherein the x-diffractive regions have characteristics such that a first x-diffractive region changes a traveling direction of the x-incident light to achieve a greater change in y-coordinate of the light at the position at which the x-incident light has traveled the predetermined distance in the z-axis direction, than a second x-diffractive region that is located closer to the origin than the first x-diffractive region.

3. The diffractive optical element according to claim 1, wherein the diffractive optical element comprises a first plurality of x-diffractive regions arranged along the x-axis on a positive side of the origin, and a second plurality of x-diffractive regions arranged along the x-axis on a negative side of the origin, each x-diffractive region being formed with the first diffractive grating;
   wherein the first plurality of x-diffractive regions have characteristics such that an x-diffractive region located farther from the origin causes the x-incident light to reach a larger y-coordinate and a smaller x-coordinate at the position at which the x-incident light has traveled the predetermined distance in the z-axis direction, than another x-diffractive region located closer to the origin; and
   wherein the second plurality of x-diffractive regions have characteristics such that an x-diffractive region located farther from the origin causes the x-incident light to reach a smaller y-coordinate and a larger x-coordinate at the position at which the x-incident light has traveled the predetermined distance in the z-axis direction, than another x-diffractive region located closer to the origin.

4. The diffractive optical element according to claim 1, wherein the diffractive optical element comprises a first plurality of x-diffractive regions arranged along the x-axis on a positive side of the origin, and a second plurality of x-diffractive regions arranged along the x-axis on a negative side of the origin, each x-diffractive region being formed with the first diffractive grating;
  wherein the first plurality of x-diffractive regions have characteristics such that an x-diffractive region located farther from the origin causes the x-incident light to reach a smaller y-coordinate and a smaller x-coordinate at the position at which the x-incident light has traveled the predetermined distance in the z-axis direction, than another x-diffractive region located closer to the origin; and
  wherein the second plurality of x-diffractive regions have characteristics such that an x-diffractive region located farther from the origin causes the x-incident light to reach a larger y-coordinate and a larger x-coordinate at the position at which the x-incident light has traveled the predetermined distance in the z-axis direction, than another x-diffractive region located closer to the origin.

5. The diffractive optical element according to claim 1, further comprising:
  a second diffractive grating that twists y-incident light which is parallel light forming a flat plane parallel to the y-axis and advancing in the z-axis direction, such that an angle of the flat plane with respect to the y-axis becomes a predetermined angle at a position at which the y-incident light has traveled a predetermined distance in the z-axis direction.

6. The diffractive optical element according to claim 5, wherein the diffractive optical element comprises a plurality of y-diffractive regions arranged along the y-axis, each y-diffractive region being formed with the second diffractive grating, and
  wherein the y-diffractive regions have characteristics such that a first y-diffractive region changes a traveling direction of the y-incident light to achieve a greater change in x-coordinate of the light at the position at which the y-incident light has traveled the predetermined distance in the z-axis direction, than a second y-diffractive region that is located closer to the origin than the first y-diffractive region.

7. The diffractive optical element according to claim 5, wherein the diffractive optical element comprises a first plurality of y-diffractive regions arranged along the y-axis on a positive side of the origin, and a second plurality of y-diffractive regions arranged along the y-axis on a negative side of the origin, each y-diffractive region being formed with the second diffractive grating;
  wherein the first plurality of y-diffractive regions have characteristics such that an y-diffractive region located farther from the origin causes the y-incident light to reach a larger x-coordinate and a smaller y-coordinate at the position at which the y-incident light has traveled the predetermined distance in the z-axis direction, than another y-diffractive region located closer to the origin; and
  wherein the second plurality of y-diffractive regions have characteristics such that a y-diffractive region located farther from the origin causes the y-incident light to reach a smaller x-coordinate and a larger y-coordinate at the position at which the y-incident light has traveled the predetermined distance in the z-axis direction, than another y-diffractive region located closer to the origin.

8. The diffractive optical element according to claim 5, wherein the diffractive optical element comprises a first plurality of y-diffractive regions arranged along the y-axis on a positive side of the origin, and a second plurality of y-diffractive regions arranged along the y-axis on a negative side of the origin, each y-diffractive region being formed with the second diffractive grating;
  wherein the first plurality of y-diffractive regions have characteristics such that a y-diffractive region located farther from the origin causes the y-incident light to reach a smaller x-coordinate and a smaller y-coordinate at the position at which the y-incident light has traveled the predetermined distance in the z-axis direction, than another y-diffractive region located closer to the origin; and
  wherein the second plurality of y-diffractive regions have characteristics such that a y-diffractive region located farther from the origin causes the y-incident light to reach a larger x-coordinate and a larger y-coordinate at the position at which the y-incident light has traveled the predetermined distance in the z-axis direction, than another y-diffractive region located closer to the origin.

9. The diffractive optical element according to claim 5, wherein the second diffractive grating splits the y-incident light advancing in the z-axis direction into a predetermined number of parallel lights traveling in different directions from one another.

10. The diffractive optical element according to claim 5, wherein the second diffractive grating diffracts the y-incident light advancing in the z-axis direction so that a beam of a direction travelling in a straight line is suppressed.

11. The diffractive optical element according to claim 1, wherein the multi-point divergence diffractive grating splits the x-incident light advancing in the z-axis direction into three or more parallel lights traveling in different directions from one another.

12. The diffractive optical element according to claim 1, wherein the first diffractive grating splits the x-incident light advancing in the z-axis direction into a plurality of parallel lights traveling in different directions from one another with respect to an x-coordinate.

13. The diffractive optical element according to claim 1, wherein the first diffractive grating splits the x-incident light advancing in the z-axis direction into a plurality of parallel lights traveling in different directions from one another with respect to a y-coordinate.

14. The diffractive optical element according to claim 1, wherein the first diffractive grating splits the x-incident light advancing in the z-axis direction into a predetermined number of parallel lights traveling in different directions from one another.

15. The diffractive optical element according to claim 14, wherein the multi-point divergence diffractive grating of the first diffractive grating includes a predetermined number of element regions for splitting the x-incident light advancing in the z-axis direction into the predetermined number of parallel lights traveling in different directions from one another.

16. The diffractive optical element according to claim 1, wherein the first diffractive grating diffracts the x-incident light advancing in the z-axis direction so that a beam of a direction travelling in a straight line is suppressed.

17. The diffractive optical element according to claim 1, wherein the first diffractive grating splits the x-incident light advancing in the z-axis direction into the plurality of parallel lights traveling in different directions from one another so that a first parallel light and a second parallel light, whose counterclockwise twist and clockwise twist are different, are mixed.

18. The diffractive optical element according to claim 17, wherein the first diffractive grating diffracts the x-incident light advancing in the z-axis direction so that the first parallel light and the second parallel light are alternatively arranged.

19. The diffractive optical element according to claim 17, wherein the first diffractive grating diffracts the x-incident light advancing in the z-axis direction so that the first parallel light and the second parallel light are superimposed on each other.

20. A distance measuring apparatus comprising:
a parallel-light generating unit that, in a coordinate space defined by an origin, an x-axis, a y-axis and a z-axis, generates parallel light forming a flat plane parallel to the x-axis and advancing in a z-axis direction;
a diffractive optical element provided with a diffractive grating pattern that twists the parallel light such that an angle of the flat plane formed by the parallel light with respect to the x-axis becomes a predetermined angle at a position at which the parallel light has traveled a predetermined distance in the z-axis direction;
an image pickup unit that picks up a projected light spot which is formed on an object that is a target of distance measurement and formed by the parallel light twisted by the diffractive optical element; and
a distance measuring unit that measures a distance to the object based on a tilting of the projected light spot detected from a picked-up image picked up by the image pickup unit with respect to the x-axis.

21. The distance measuring apparatus according to claim 20, wherein the diffractive optical element (a) splits the parallel light forming the flat plane parallel to the x-axis generated by the parallel-light generating unit into a plurality of parallel lights, and (b) twists the generated parallel light such that an angle of a flat plane of the split parallel light with respect to the x-axis becomes a predetermined angle at a position at which the split parallel light has traveled a predetermined distance in the z-axis direction;
wherein the image pickup unit picks up a plurality of projected light spots formed on the object by the plurality of parallel lights split by the diffractive optical element;
wherein the distance measuring unit measures respective distances to a plurality of points where the projected light spots are formed on the object based on respective tilting of the plurality of projected light spots picked up by the image pickup unit with respect to the x-axis; and
wherein the distance measuring apparatus further comprises a range image generating unit that generates a range image including a plurality of pixel values corresponding to the plurality of distances measured by the distance measuring unit.

22. The distance measuring apparatus according to claim 20, wherein the diffractive optical element (a) splits the parallel light forming the flat plane parallel to the x-axis generated by the parallel-light generating unit into first parallel light and second parallel light, and (b) twists the generated parallel light such that (i) an angle of a flat plane formed by the first parallel light with reference to a positive direction of the x-axis becomes the predetermined angle and (ii) an angle of a flat plane formed by the second parallel light with reference to a negative direction of the x-axis becomes the predetermined angle at a position at which the split parallel light has traveled a predetermined distance in the z-axis direction;
wherein the image pickup unit picks up a first projected light spot formed on the object by the first parallel light and a second projected light spot formed on the object by the second parallel light emitted by the diffractive optical element;
wherein the distance measuring apparatus further comprises:
a tilting detecting unit that, from a picked-up image picked up by the image pickup unit, detects a first tilting of the first projected light spot with respect to the x-axis and a second tilting of the second projected light spot with respect to the x-axis; and
an error eliminating unit that eliminates a detection error in the first tilting and the second tilting based on the first tilting and the second tilting detected by the tilting detecting unit; and
wherein the distance measuring unit measures, based on the first tilting and the second tilting with an error being eliminated by the error eliminating unit, a distance to a point on the object where the first projected light spot is formed and a distance to a point on the object where the second projected light spot is formed.

23. The distance measuring apparatus according to claim 22, wherein the diffractive optical element causes the generated parallel lights to be diffracted such that the flat plane of the first parallel light and the flat plane of the second parallel light are superimposed on each other at a further position at which the split parallel light has traveled a further predetermined distance in the z-axis direction.

24. The distance measuring apparatus according to claim 20, wherein the parallel-light generating unit further generates parallel light forming a flat plane parallel to the y-axis and advancing in the z-axis direction;
wherein the diffractive optical element twists the parallel lights generated by the parallel-light generating unit, which form respective flat planes orthogonal to each other, such that (i) an angle between one of the flat planes and the x-axis becomes a predetermined angle and (ii) the flat planes remain orthogonal to each other, at a position at which the parallel lights have traveled a predetermined distance in the z-axis direction; and
wherein the distance measuring unit measures the distance to the object based on tilting with respect to the x-axis of orthogonal light spots formed on the object by the respective parallel lights in the image picked up by the image pickup unit.

25. A distance measuring method comprising:
a parallel-light generating step of generating, in a coordinate space defined by an origin, an x-axis, a y-axis and a z-axis, parallel light forming a flat plane parallel to the x-axis and advancing in a z-axis direction;
a diffraction step of causing a diffractive optical element provided with a diffractive grating pattern to twist the parallel light such that an angle of the flat plane formed by the parallel light with respect to the x-axis becomes a predetermined angle at a position at which the parallel light has traveled a predetermined distance in the z-axis direction;
an image pickup step of picking up a projected light spot which is formed on an object that is a target of distance measurement and formed by the parallel light twisted through the diffraction step; and
a distance measuring step of measuring a distance to the object based on a tilting of the projected light spot detected from a picked-up image picked up by the image pickup step with respect to the x-axis.

* * * * *